United States Patent
Hisakado et al.

(10) Patent No.: US 8,937,696 B2
(45) Date of Patent: Jan. 20, 2015

(54) CELLULOSE ACYLATE FILM, ITS PRODUCTION METHOD, POLARIZER AND LIQUID CRYSTAL DISPLAY DEVICE

(75) Inventors: Yoshiaki Hisakado, Kanagawa (JP); Jun Takeda, Kanagawa (JP); Isao Fujiwara, Kanagawa (JP); Masato Nagura, Kanagawa (JP); Nobutaka Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 734 days.

(21) Appl. No.: 13/064,779

(22) Filed: Apr. 14, 2011

(65) Prior Publication Data
US 2011/0255037 A1 Oct. 20, 2011

(30) Foreign Application Priority Data

Apr. 19, 2010 (JP) ................. 2010-096470
Aug. 25, 2010 (JP) ................. 2010-188438
Mar. 9, 2011 (JP) ................. 2011-051796

(51) Int. Cl.
| | |
|---|---|
| G02F 1/1335 | (2006.01) |
| C09K 19/00 | (2006.01) |
| G02B 5/30 | (2006.01) |
| B29C 41/28 | (2006.01) |
| B29C 55/08 | (2006.01) |
| B32B 23/08 | (2006.01) |
| B32B 27/08 | (2006.01) |
| B32B 27/28 | (2006.01) |

(Continued)

(52) U.S. Cl.
CPC .............. *G02B 5/3083* (2013.01); *B29C 41/28* (2013.01); *B29C 55/08* (2013.01); *B32B 23/08* (2013.01); *B32B 27/08* (2013.01); *B32B 27/28* (2013.01); *G02B 1/04* (2013.01); *B29K 2001/00* (2013.01); *B29K 2001/12* (2013.01); *B29K 2005/00* (2013.01); *B29K 2995/0034* (2013.01)
USPC .............. 349/96; 349/117; 428/1.3; 428/1.31

(58) Field of Classification Search
USPC .............................. 349/96, 117; 428/1.3, 1.31
See application file for complete search history.

(56) References Cited

U.S. PATENT DOCUMENTS

2007/0252293 A1* 11/2007 Sato et al. ................ 264/1.31
2008/0173215 A1* 7/2008 Sakurazawa et al. .... 106/168.01

(Continued)

FOREIGN PATENT DOCUMENTS

| | | |
|---|---|---|
| JP | 2002-179819 | 6/2002 |
| JP | 2005-306924 A | 11/2005 |

(Continued)

OTHER PUBLICATIONS

The MAC Humidity/Moisture Handbook (www.macinstruments.com/pdf/handbook.pdf).*

(Continued)

*Primary Examiner* — Edward Glick
*Assistant Examiner* — David Chung
(74) *Attorney, Agent, or Firm* — Jean C. Edwards, Esq.; Edwards Neils PLLC

(57) ABSTRACT

A cellulose acylate film containing a cellulose acylate and a sugar ester compound having from 1 to 12 pyranose structures or furanose structures in which at least one hydroxyl group is esterified, the film satisfying 40 nm≤Re(550)≤60 nm and 100 nm≤Rth(550)≤140 nm, and having a dimensional change of −0.5 to 0.5% and an internal haze of at most 0.1%.

8 Claims, 1 Drawing Sheet

(51) Int. Cl.
*G02B 1/04* (2006.01)
*B29K 1/00* (2006.01)

(56) References Cited

U.S. PATENT DOCUMENTS

2010/0221457 A1  9/2010  Sera
2010/0297366 A1  11/2010  Sera
2013/0285280 A1  10/2013  Sera

FOREIGN PATENT DOCUMENTS

JP     2009-001696        1/2009
JP     2009-265477 A     11/2009
JP     2010-002749 A      1/2010
WO    WO-2009-060743 A    5/2009

OTHER PUBLICATIONS

Official Action issued by Japanese Patent Office in Japanese Patent Application No. 2011-051796 on Dec. 24, 2013.

Japanese Official Action issued by JPO on Aug. 19, 2014 in connection with corresponding Japanese Patent Application No. 2011-051796.

* cited by examiner

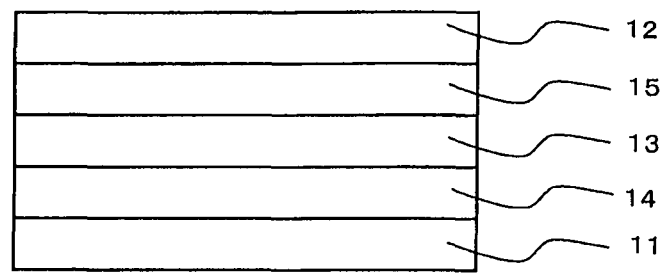

CELLULOSE ACYLATE FILM, ITS PRODUCTION METHOD, POLARIZER AND LIQUID CRYSTAL DISPLAY DEVICE

CROSS-REFERENCE TO RELATED APPLICATIONS

The present application claims the benefit of priority from Japanese Patent Application No. 2010-96470, filed on Apr. 19, 2010; Japanese Patent Application No. 2010-188438, filed on Aug. 25, 2010; and Japanese Patent Application No. 2011-51796, filed on Mar. 9, 2011, the contents of which are herein incorporated by reference in their entirety.

BACKGROUND OF THE INVENTION

1. Field of the Invention

The present invention relates to a cellulose acylate film and its production method, and to a polarizer and a liquid crystal display device comprising the cellulose acylate film. In particular, the invention relates to a cellulose acylate film favorable for use as an optical film such as a polarizer protective film, an optical compensatory film, etc.

2. Description of the Related Art

With the recent tendency toward advancing TV use of liquid crystal display devices, the panel size of the devices is enlarged and high-definition and low-price liquid crystal display devices are much desired. In particular, VA-mode liquid crystal display devices have a relatively high contrast and enjoy a relatively high production yield, and are therefore most popular liquid crystal display devices for TV use.

However, VA-mode liquid crystal display devices have a problem in that, at the time of black state, the devices could provide black that is good in some degree in the normal direction to the display panel, but when the black state panel is seen in viewing angle directions (oblique directions), there occurs light leakage to disable background black display whereby the viewing angle is narrowed. Accordingly, a retardation film is desired capable of expressing a retardation level in such a degree that enables viewing angle compensation.

Recently, further, for preventing the neutral tone on a liquid crystal display panel from being yellowed, a multigap (MG) cell has become used in which the thickness of the liquid crystal layer, or that is, the cell gap is changed for every color. However, the multigap cell is problematic in that, as compared with that on a conventional liquid crystal display panel, the color shift at the time of black state in viewing angle directions increases, and therefore, it has become much desired to further improve the multigap cell in point of preventing the color shift at the time of black state in viewing angle directions on a liquid crystal display panel.

On the other hand, the demand for use of liquid crystal display devices in various environments has become increased, and in particular, the demand for favorable use thereof in high temperature and high humidity environments, for example, for outdoor use thereof has increased. In case where a retardation film of which the dimensional change in use in high temperature and high humidity environments is large is incorporated in a liquid crystal display device, there may occur corner unevenness on the liquid crystal display panel, and therefore, it is desired to improve the durability of the film in high temperature and high humidity environments.

Further improvement of the display performance of liquid crystal display devices and further reduction in the production cost thereof are still desired, and it is desired to provide an inexpensive retardation film capable of fully attaining viewing angle compensation even though it is thin, and capable of enabling further contrast increase.

Regarding the requirements, it is known that use of a retardation film having reversed wavelength dispersion characteristics of retardation, or that is, a retardation film having optical properties of such that its in-plane retardation Re increases on a longer wavelength side is effective for preventing color shift at the time of black state in viewing angle directions on a liquid crystal display panel (see JP-A 2009-1696).

Films having reversed wavelength dispersion characteristics of retardation that have heretofore been investigated are produced by adding an additive having a negative intrinsic birefringence to a resin film. However, the additive having a negative intrinsic birefringence is expensive and has some problems in that, when such an additive having a negative intrinsic birefringence is added to a resin film, then the thickness-direction retardation Rth of the film lowers and therefore, in order to make the film express a desired retardation level, the thickness of the film must be increased or the amount of the retardation enhancer to be added to the film must be increased, and as a result, from the viewpoint of the material cost, the additive is unsatisfactory.

As opposed to this, JP-A 2009-1696 discloses a technique of adding an acrylic polymer having a negative intrinsic birefringence and further a sugar ester compound to a phthalyl/acetyl-modified heterogeneous cellulose-mixed cellulose acylate, thereby improving the light leakage resistance, the color shift resistance, the front contrast, the retardation and the wavelength dispersion characteristics of retardation of the resulting film. This patent reference suggests the possibility of stretching the film, but says nothing about high temperature and high humidity treatments of the film after stretching.

On the other hand, for improving the dimensional stability of films in high temperature and high humidity environments, JP-A 2002-179819 discloses a method of once drying a formed cellulose ester film followed by humidifying the film to thereby increase the water content of the film. The patent reference says that it is preferable to stretch the dry film in a film width direction (direction perpendicular to the film conveying direction) by from 1 to 20% or so at 80 to 150° C. or so, disclosing examples where a film is, after stretched, humidified at 70° C. and at a relative humidity of 80% or in a water bath at 40° C. However, the patent reference says nothing about use of a sugar ester compound.

SUMMARY OF THE INVENTION

The present inventors investigated the film described in JP-A 2009-1696 and have known that the properties of the film do not reach the level recently required in the art and that the reversed wavelength dispersion characteristics of retardation of the film are poor and the internal haze thereof is large. In addition, the inventors have further known that the color shift u' and v' in incorporation of the film in a liquid crystal display device could not be controlled to be on a level of at most 0.06 recently desired in the art for practical use, and further, the front contrast is also unsatisfactory. In Table 3 in the patent reference, the haze of the film No. 201 (comparative Example) in which a sugar ester compound alone is used with no use of a resin having a negative intrinsic birefringence is extremely high; or that is, an expensive resin having a negative intrinsic birefringence is indispensable in the film and the film is therefore unsatisfactory from the viewpoint of the production cost.

Similarly, the inventors investigated the film described in JP-A 2002-179819 and have known that the internal haze of the film increases extremely through humidification and, when the film is incorporated in a liquid crystal display device, then the front contrast of the device decreases. The inventors have further found that, in case where a cellulose acylate having a degree of acetylation of 61.0% is formed into a film through humidification under the condition described in examples in the patent reference, the optical appearance of the film is poor so far as an expensive retardation enhancer is not added thereto, and therefore the film is still unsatisfactory from the viewpoint of both the viewing angle compensation capability and the production cost thereof.

An object of the invention is to provide a cellulose acylate film having the advantages of high optical appearance, strong reversed wavelength dispersion characteristics of retardation, small haze, good dimensional stability in high temperature and high humidity environments and low production cost, and to provide a method for producing the film. Another object is to provide a liquid crystal display device free from problems of color shift and corner unevenness at the time of black state in viewing angle directions and having the advantages of high contrast both in front direction and in viewing angle directions.

With the above-mentioned objects, the inventors have assiduously studied and, as a result, have found that, even though a compound having a negative birefringence is not used but only when an sugar ester is used as an additive and when a stretched film is processed for high temperature and high humidity treatment in an environment at a specific temperature and at a specific volumetric humidity, then surprisingly a cellulose acylate film having the advantages of high optical appearance, strong reversed wavelength dispersion characteristics of retardation, small haze, good dimensional stability in high temperature and high humidity environments and low production cost can be produced.

Specifically, the inventors have found that, when a stretched film is processed for high temperature and high humidity treatment under a specific condition using a specific additive, then the above-mentioned objects can be attained, and have completed the present invention.

Concretely, the inventors have attained the objects according to the following means:

[1] A cellulose acylate film comprising a cellulose acylate and a sugar ester compound wherein:

the sugar ester comprises from 1 to 12 pyranose structures or furanose structures in which at least one hydroxyl group is esterified, the film has an in-plane retardation at a wavelength of 550 nm satisfying the following formula (1):

$$40 \text{ nm} \leq Re(550) \leq 60 \text{ nm} \tag{1}$$

wherein $Re(550)$ means the in-plane retardation of the film at a wavelength of 550 nm, the film has a thickness-direction retardation at a wavelength of 550 nm satisfying the following formula (2):

$$100 \text{ nm} \leq Rth(550) \leq 140 \text{ nm} \tag{2}$$

wherein $Rth(550)$ means the thickness-direction retardation of the film at a wavelength of 550 nm, the film has a dimensional change before and after 24 hours at 60° C. and at a relative humidity of 90% satisfying the following formula (3) in the film conveying direction and in the direction perpendicular thereto, $$-0.5\% \leq \{(L'-L0)/L0\} \times 100 \leq 0.5\% \tag{3}$$

wherein L0 means the length (unit: mm) of the film before aged for 24 hours at 60° C. and at a relative humidity of 90%; and L' means the length (unit: mm) of the film after aged for 24 hours at 60° C. and at a relative humidity of 90% and further after conditioned for 2 hours, and the film has an internal haze of at most 0.1%.

[2] The cellulose acylate film of [1], satisfying the following formula (4):

$$0.02 \leq \Delta Re/Re(550) \leq 0.28 \tag{4}$$

$$\Delta Re = Re(630) - Re(450) \tag{4'}$$

wherein $Re(630)$ means the in-plane retardation of the film at a wavelength of 630 nm; $Re(450)$ means the in-plane retardation of the film at a wavelength of 450 nm; $Re(550)$ means the in-plane retardation of the film at a wavelength of 550 nm.

[3] The cellulose acylate film of [1], satisfying the following formula (5):

$$0.11 \leq \Delta Re/Re(550) \leq 0.23 \tag{5}$$

$$\Delta Re = Re(630) - Re(450) \tag{5'}$$

wherein $Re(630)$ means the in-plane retardation of the film at a wavelength of 630 nm; $Re(450)$ means the in-plane retardation of the film at a wavelength of 450 nm; $Re(550)$ means the in-plane retardation of the film at a wavelength of 550 nm.

[4] The cellulose acylate film of any one of [1] to [3], wherein the degree of acyl substitution of the cellulose acylate is from 2.0 to 2.6.

[5] The cellulose acylate film of any one of [1] to [4], wherein the cellulose acylate is a cellulose acetate.

[6] The cellulose acylate film of any one of [1] to [5], comprising an additive having a negative intrinsic birefringence.

[7] The cellulose acylate film of any one of [1] to [6], satisfying the following formula (6):

$$1.5 \times 10^{-3} < Rth(550)/d \tag{6}$$

wherein $Rth(550)$ means the thickness-direction retardation (unit: nm) of the film at a wavelength of 550 nm, and d means the thickness (unit: mm) of the film.

[8] The cellulose acylate film of any one of [1] to [7], having a thickness of from 40 to 80 μm.

[9] The cellulose acylate film of any one of [1] to [8], comprising a nitrogen-containing aromatic compound-type plasticizer.

[10] A method for producing a cellulose acylate film, which comprises forming a polymer solution that comprises a cellulose acylate and a sugar ester compound comprising from 1 to 12 pyranose structures or furanose structures in which at least one hydroxyl group is esterified, into a film, stretching the film, and processing the stretched film for high temperature and high humidity treatment under a condition satisfying the following formulae (7) and (8):

$$70° \text{ C.} \leq \text{temperature of the treatment} \leq 140° \text{ C.} \tag{7}$$

$$250 \text{ g/m}^3 \leq \text{volumetric humidity of the treatment} \leq 400 \text{ g/m}^3 \tag{8}$$

[11] The method for producing a cellulose acylate film of [10], wherein the film is stretched at a temperature not higher than (Tg−5° C.) in which Tg means the glass transition temperature (unit: ° C.) of the unstretched cellulose acylate film.

[12] The method for producing a cellulose acylate film of [10] or [11], wherein the cellulose acylate has a degree of acyl substitution of from 2.0 to 2.6.

[13] The method for producing a cellulose acylate film of any one of [10] to [12], wherein the cellulose acylate is a cellulose acetate.

[14] The method for producing a cellulose acylate film of any one of [10] to [13], wherein the polymer solution comprises an additive having a negative intrinsic birefringence.

[15] The method for producing a cellulose acylate film of any one of [10] to [14], wherein the polymer solution comprises a nitrogen-containing aromatic compound-type plasticizer.

[16] A cellulose acylate film produced by the method for producing a cellulose acylate film of any one of [10] to [15].

[17] A polarizer comprising a polarizing element and the cellulose acylate film of any one of [1] to [9] and [15] on at least one side of the polarizing element.

[18] A liquid crystal display device comprising at least one polarizer of. [17].

The invention provides a cellulose acylate film having the advantages of high optical appearance, strong reversed wavelength dispersion characteristics of retardation, small haze, good dimensional stability in high temperature and high humidity environments and low production cost, and a method for producing the film. In addition, the invention also provides a liquid crystal display device free from problems of color shift and corner unevenness at the time of black state in viewing angle directions and having the advantages of high contrast both in front direction and in viewing angle directions.

BRIEF DESCRIPTION OF DRAWING

FIG. 1 is a schematic cross-sectional view of one example of a VA-mode liquid crystal display device of the invention. In the drawing, 11 is a polarizing element, 12 is a polarizing element, 13 is a liquid crystal cell, 14 and 15 each are a cellulose acylate film.

BEST MODE FOR CARRYING OUT THE INVENTION

The contents of the invention are described in detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof. In this description, "front side" means the panel side of the display device, and "rear side" means the backlight side thereof. In this description, "front" means the normal direction to the panel of the display device, and "front contrast (hereinafter "contrast" may be referred to as CR)" means the contrast as computed from the brightness at the time of white state and the brightness at the time of black state measured in the normal direction to the display panel.

[Cellulose Acylate Film]

The cellulose acylate film of the invention (hereinafter this may be referred to as "the film of the invention") comprises a cellulose acylate and a sugar ester compound containing from 1 to 12 pyranose structures or furanose structures where at least one hydroxyl group is esterified, of which the in-plane retardation and the thickness-direction retardation at a wavelength of 550 nm satisfy the following formulae (1) and (2), respectively, of which the dimensional change before and after 24 hours at 60° C. and at a relative humidity of 90% satisfies the following formula (3) in the film conveying direction and in the direction perpendicular thereto, and of which the internal haze is at most 0.1%:

$$40\ nm \leq Re(550) \leq 60\ nm \quad (1)$$

wherein $Re(550)$ means the in-plane retardation of the film at a wavelength of 550 nm, $$100\ nm \leq Rth(550) \leq 140\ nm \quad (2)$$

wherein $Rth(550)$ means the thickness-direction retardation of the film at a wavelength of 550 nm, $$-0.5\% \leq \{(L'-L0)/L0\} \times 100 \leq 0.5\% \quad (3)$$

wherein L0 means the length (unit: mm) of the film before aged for 24 hours at 60° C. and at a relative humidity of 90%; and L' means the length (unit: mm) of the film after aged for 24 hours at 60° C. and at a relative humidity of 90% and further after conditioned for 2 hours.

The film of the invention is described below.

<Cellulose Acylate>

The film of the invention contains a cellulose acylate. The cellulose acylate for use in the invention is described below.

The starting cellulose for the cellulose acylate for use in the invention includes cotton linter and wood pulp (hardwood pulp, softwood pulp), etc.; and any cellulose acylate obtained from any starting cellulose can be used herein. As the case may be, different starting celluloses may be mixed for use herein. The starting cellulose materials are described in detail, for example, in Marusawa & Uda's "Plastic Material Lecture (17), Cellulosic Resin" (by Nikkan Kogyo Shinbun, 1970), and in Hatsumei Kyokai Disclosure Bulletin No. 2001-1745, pp. 7-8. Cellulose materials described in these may be used for the cellulose acylate film for the invention with no specific limitation.

The cellulose acylate preferably used in the invention is described in detail. The β-1,4-bonding glucose unit to constitute cellulose has a free hydroxyl group at the 2-, 3- and 6-positions. The cellulose acylate is a polymer produced by esterifying a part or all of those hydroxyl groups in cellulose with an acyl group. The degree of acyl substitution means the total of the ratio of acylation of the hydroxyl group in cellulose positioned in the 2-, 3- and 6-positions in the unit therein. In case where the hydroxyl group is 100% acylated at each position, the degree of substitution at that position is 1.

Only one or two or more different types of acyl groups may be used, either singly or as combined, in the cellulose acylate for use in the invention.

Not specifically defined, the acyl group in the cellulose acylate for use in the invention may be an aliphatic group or an aryl group. For example, the ester is an alkylcarbonyl ester, an alkenylcarbonyl ester, an aromatic carbonyl ester or an aromatic alkylcarbonyl ester of cellulose, in which the acyl group may be further substituted. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a tert-butanoyl group, a cyclohexanecarbonyl group, an oleoyl group, a benzoyl group, a naphthylcarbonyl group, a cinnamoyl group, etc. Of those, preferred are an acetyl group, a propionyl group, a butanoyl group, a dodecanoyl group, an octadecanoyl group, a tert-butanoyl group, an oleoyl group, a benzoyl group, a naphthylcarbonyl group, and a cinnamoyl group; more preferred are an acetyl group, a propionyl group and a butanoyl group (acyl group having from 2 to 4 carbon atoms). Even more preferred is an acetyl group (in this case, the cellulose acylate is a cellulose acetate).

The cellulose acylate includes triacetyl cellulose (TAC), diacetyl cellulose (DAC), cellulose acetate propionate (CAP), cellulose acetate butyrate (CAB), cellulose acetate phthalate, etc. Preferably, in the cellulose acylate film of the invention, all the acyl groups in the cellulose acylate are acetyl groups from the viewpoint of the retardation and the cost of the film.

Preferably, in the film of the invention, the degree of acyl substitution of the cellulose acylate satisfies from 2.0 to 2.6 from the viewpoint of the retardation and the cost of the film and from the viewpoint that, when the film is incorporated in a liquid crystal display device, it is effective for increasing the display contrast of the device. More preferably, the degree of acyl substitution of the cellulose acylate is from 2.1 to 2.55, even more preferably from 2.20 to 2.50

The degree of acyl substitution may be determined according to the method stipulated in ASTM-D817-96. The part not substituted with an acyl group is generally a hydroxyl group.

In a preferred embodiment of the invention, even a cellulose acylate film that contains a cellulose acylate having a low degree of acyl substitution could be improved in both the dimensional stability under high temperature and high humidity conditions and the reversed wavelength dispersion characteristics of retardation (having positive ΔRe) thereof, and therefore in the invention, a cellulose acylate film that contains such a cellulose acylate having a low degree of acyl substitution can be produced. The cellulose acylate film that contains such a cellulose acylate having a low degree of acyl substitution could not be produced under conventional production conditions owing to poor dimensional stability thereof under high temperature and high humidity conditions.

The cellulose acylate can be produced in known methods. For example, it can be produced according to the method described in JP-A 10-45804.

In case where an acid anhydride or an acid chloride is used as the acylating agent for acylation of cellulose, an organic acid such as acetic acid, or methylene chloride or the like may be used as the organic solvent to be the reaction solvent.

In case where the acylating agent is an acid anhydride, the catalyst is preferably a protic catalyst such as sulfuric acid; and in case where the acylating agent is an acid chloride (e.g., $CH_3CH_2COCl$), a basic compound may be used as the catalyst.

A most popular industrial-scale production method for a mixed fatty acid ester of cellulose comprises acylating cellulose with a mixed organic acid component that contains a fatty acid (e.g., acetic acid, propionic acid, valeric acid) corresponding to an acetyl group or other acyl group, or its acid anhydride.

Preferably, the molecular weight of the cellulose acylate is from 40000 to 200000 in terms of the number-average molecular weight (Mn) thereof, more preferably from 100000 to 200000. Also preferably, the ratio of Mw/Mn of the cellulose acylate for use in the invention is at most 4.0, more preferably from 1.4 to 2.3.

In the invention, the mean molecular weight and the molecular weight distribution of cellulose acylate and others may be determined by measuring the number-average molecular weight (Mn) and the weight-average molecular weight (Mw) thereof through gel permeation chromatography (GPC) followed by computing the ratio of the resulting data according to the method described in WO2008-126535.
<Additive>
(Sugar Ester Compound)

The film of the invention contains a sugar ester compound.

Adding a sugar ester compound to the cellulose acylate film may reduce the internal haze of the film even in the presence of high temperature and high humidity treatment after stretching the film, not detracting from the ability of the film to express the optical properties thereof. Further, when the cellulose acylate film of the invention is used in a liquid crystal display device, the front contrast can be significantly improved.
—Sugar Residue—

The sugar ester compound means a compound where at least one substitutable compound (for example, hydroxyl group, carboxyl group) in the monose or polyose constituting the compound is ester-bonded to at least one substituent therein. Specifically, the sugar ester compound as referred to herein includes sugar derivatives in a broad sense of the word, and for example, includes compounds having a sugar residue as the structural unit thereof such as gluconic acid. Concretely, the sugar ester compound includes an ester of glucose and a carboxylic acid, and an ester of gluconic acid and an alcohol.

The substitutable group in the monose or polyose constituting the sugar ester compound is preferably a hydroxyl group.

The sugar ester compound includes a monose or polyose-derived structure (hereinafter this may be referred to as a sugar residue) that constitutes the sugar ester compound. The structure per monose of the sugar residue is referred to as the structural unit of the sugar ester compound. The structural unit of the sugar ester compound preferably includes a pyranose structural unit or a furanose structural unit, more preferably, all the sugar residues are pyranose structural units or furanose structural units. In case where the sugar ester is formed of a polyose, it preferably includes both a pyranose structural unit and a furanose structural unit.

The sugar residue of the sugar ester compound may be a pentose-derived one or a hexose-derived one, but is preferably a hexose-derived one.

Preferably, the number of the structural units contained in the sugar ester compound is from 1 to 12, more preferably from 1 to 6, even more preferably 1 or 2.

In the invention, preferably, the sugar ester compound contains from 1 to 12 pyranose structural units or furanose structural units in which at least one hydroxyl group is esterified, even more preferably, one or two pyranose structural units or furanose structural units in which at least one hydroxyl group is esterified.

Examples of monoses or polyoses containing from 2 to 12 monose units include, for example, erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, baltopentaose, belbalcose, maltohexaose, α-cyclodextrin, β-cyclodextrin, γ-cyclodextrin, δ-cyclodextrin, xylitol, sorbitol, etc.

Preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, sorbitol; more preferred are arabinose, xylose, glucose, fructose, mannose, galactose, maltose, cellobiose, sucrose, β-cyclodextrin, γ-cyclodextrin; and even more preferred are xylose, glucose, fructose, mannose, galactose, maltose, cellobiose, sucrose, xylitol, sorbitol. The sugar ester compound has a glucose skeleton or a sucrose skeleton, which is described in [0059] in JP-A 2009-1696 as the compound 5 therein. The sugar ester compound of the type is, as compared with the sugar ester compound having a maltose skeleton used in Examples in the patent reference, especially preferred from the viewpoint of the compatibility thereof with polymer.

—Structure of Substituent—

More preferably, the sugar ester compound for use in the invention has, including the substituent therein, a structure represented by the following formula (1):

$(OH)_p\text{-}G\text{-}(L^1\text{-}R^{11})_q(O\text{---}R^{12})_r$ (1)

wherein G represents a sugar residue; $L^1$ represents any one of —O—, —CO— or —$NR^{13}$—; $R^{11}$ represents a hydrogen atom or a monovalent substituent; $R^{12}$ represents a monovalent substituent bonding to the formula via an ester bond; p, q and r each independently indicate an integer of 0 or more, and p+q+r is equal to the number of the hydroxyl groups on the presumption that G is an unsubstituted sugar group having a cyclic acetal structure.

The preferred range of G is the same as the preferred range of the above-mentioned sugar residue.

$L^1$ is preferably —O— or —CO—, more preferably —O—. When $L^1$ is —O—, it is more preferably an ether bond or ester bond-derived linking group, even more preferably an ester bond-derived linking group.

In case where the formula has plural $L^1$'s, then they may be the same or different.

Preferably, at least one of $R^{11}$ and $R^{12}$ has an aromatic ring.

In particular, in case where $L^1$ is —O— (or that is, in case where the hydroxyl group in the above-mentioned sugar ester compound is substituted with $R^{11}$ and $R^{12}$), preferably, $R^{11}$, $R^{12}$ and $R^{13}$ are selected from a substituted or unsubstituted acyl group, a substituted or unsubstituted aryl group, a substituted or unsubstituted alkyl group, or a substituted or unsubstituted amino group, more preferably from a substituted or unsubstituted acyl group, a substituted or unsubstituted alkyl group, or a substituted or unsubstituted aryl group, even more preferably from an unsubstituted acyl group, a substituted or unsubstituted alkyl group, or an unsubstituted aryl group.

In case where the formula has plural $R^{11}$'s, $R^{12}$'s and $R^{13}$'s, they may be the same or different.

p is an integer of 0 or more, and its preferred range is the same as the preferred range of the number of the hydroxyl groups per the monose unit to be mentioned below, however, in the invention, p is preferably zero (0).

r is preferably a number larger than the number of the pyranose structural units or the furanose structural units contained in G.

q is preferably 0.

p+q+r is equal to the number of the hydroxyl groups on the presumption that G is an unsubstituted sugar group having a cyclic acetal structure, and therefore, the uppermost limit of these p, q and r is specifically defined depending on the structure of G.

Preferred examples of the substituent of the sugar ester compound include an alkyl group (preferably an alkyl group having from 1 to 22 carbon atoms, more preferably from 1 to 12 carbon atoms, even more preferably from 1 to 8 carbon atoms, for example, a methyl group, an ethyl group, a propyl group, a hydroxyethyl group a hydroxypropyl group, a 2-cyanoethyl group, a benzyl group), an aryl group (preferably an aryl group having from 6 to 24 carbon atoms, more preferably from 6 to 18 carbon atoms, even more preferably from 6 to 12 carbon atoms, for example, a phenyl group, a naphthyl group), an acyl group (preferably an acyl group having from 1 to 22 carbon atoms, more preferably from 2 to 12 carbon atoms, even more preferably from 2 to 8 carbon atoms, for example, an acetyl group, a propionyl group, a butyryl group, a pentanoyl group, a hexanoyl group, an octanoyl group, a benzoyl group, a toluoyl group, a phthalyl group), an amide group (preferably an amide group having from 1 to 22 carbon atoms, more preferably from 2 to 12 carbon atoms, even more preferably from 2 to 8 carbon atoms, for example, a formamide group, an acetamide group), an imide group (preferably an imide group having from 4 to 22 carbon atoms, more preferably from 4 to 12 carbon atoms, even more preferably from 4 to 8 carbon atoms, for example, a succinimide group, a phthalimide group), an aryl-alkyl group (preferably an aryl group having from 7 to 25 carbon atoms, more preferably from 7 to 19 carbon atoms, even more preferably from 7 to 13 carbon atoms, for example, a benzyl group). Of those, more preferred are an alkyl group and an acyl group; and even more preferred are a methyl group, an acetyl group, a benzoyl group and a benzyl group; and especially preferred are an acetyl group and a benzyl group. Especially of those, in case where the constitutive sugar in the sugar ester compound is a sucrose skeleton, preferred are sugar ester compounds having an acetyl group and a benzyl group as the substituents therein, as compared with the sugar ester compound with a benzoyl group described as the compound 3 in [0058] in JP-A 2009-1696 and used in Examples in the patent reference, in point of the compatibility thereof with polymer.

Preferably, the number of the hydroxyl groups per the structural unit in the sugar ester compound (hereinafter this may be referred to as a hydroxyl group content) is at most 3, more preferably at most 1, even more preferably zero (0). Controlling the hydroxyl group content to fall within the range is preferred since the sugar ester compound may be prevented from moving into the adjacent polarizing element layer to break the PVA-iodine complex therein while aged under high temperature and high humidity condition, and therefore the polarizing element performance may be prevented from worsening in aging under high temperature and high humidity condition.

Preferably, in the sugar ester compound for use in the film of the invention, an unsubstituted hydroxyl group does not exist and the substituents therein are an acetyl group and/or a benzyl group alone.

Regarding the proportion of the acetyl group and the benzyl group in the sugar ester compound, preferably, the proportion of the benzyl group is smaller in some degree. This is because the wavelength dispersion characteristics of retardation of the cellulose acylate film of the type, ΔRe and ΔRe/Re(500) may increase and, when the film is incorporated in a liquid crystal display device, the color shift at the time of black state could be small. Concretely, the ratio of the benzyl group to the sum total of all the unsubstituted hydroxyl groups and all the substituents in the sugar ester compound is preferably at most 60%, more preferably at most 40%.

The sugar ester compounds are available as commercial products such as Tokyo Chemical's Aldrich, etc., or may be produced according to known methods of converting commercially-available hydrocarbons into ester derivatives thereof (for example, according to the method described in JP-A 8-245678).

Preferably, the sugar ester compound has a number-average molecular weight of from 200 to 3500, more preferably from 200 to 3000, even more preferably from 250 to 2000.

Specific examples of the sugar ester compounds preferred for use in the invention are mentioned below; however, the invention is not limited to the following embodiments.

In the structural formulae mentioned below, R each independently represents an arbitrary substituent, and plural R's may be the same or different.

Sugar Ester (1)

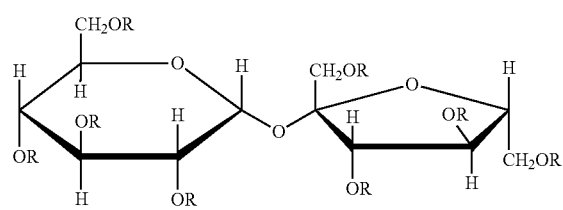

TABLE 1

| Compound | Substituent 1 | | Substituent 2 | | Molecular Weight |
| | type | degree of substitution | type | degree of substitution | |
|---|---|---|---|---|---|
| 100 | acetyl | 8 | benzyl | 0 | 679 |
| 101 | acetyl | 7 | benzyl | 1 | 727 |
| 102 | acetyl | 6 | benzyl | 2 | 775 |
| 103 | acetyl | 5 | benzyl | 3 | 817 |
| 104 | acetyl | 0 | benzyl | 8 | 1063 |
| 105 | acetyl | 7 | benzoyl | 1 | 741 |
| 106 | acetyl | 6 | benzoyl | 2 | 802 |
| 107 | benzyl | 2 | no | 0 | 523 |
| 108 | benzyl | 3 | no | 0 | 613 |
| 109 | benzyl | 4 | no | 0 | 702 |
| 110 | acetyl | 7 | phenylacetyl | 1 | 771 |
| 111 | acetyl | 6 | phenylacetyl | 2 | 847 |

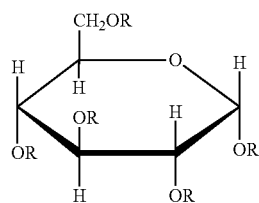

TABLE 2

| Compound | Substituent 1 | | Substituent 2 | | Molecular Weight |
| | type | degree of substitution | type | degree of substitution | |
|---|---|---|---|---|---|
| 201 | acetyl | 4 | benzoyl | 1 | 468 |
| 202 | acetyl | 3 | benzoyl | 2 | 514 |
| 203 | acetyl | 2 | benzoyl | 3 | 577 |
| 204 | acetyl | 4 | benzyl | 1 | 454 |
| 205 | acetyl | 3 | benzyl | 2 | 489 |
| 206 | acetyl | 2 | benzyl | 3 | 535 |
| 207 | acetyl | 4 | phenylacetyl | 1 | 466 |
| 208 | acetyl | 3 | phenylacetyl | 2 | 543 |
| 209 | acetyl | 2 | phenylacetyl | 3 | 619 |
| 210 | phenylacetyl | 1 | no | 0 | 298 |
| 211 | phenylacetyl | 2 | no | 0 | 416 |
| 212 | phenylacetyl | 3 | no | 0 | 535 |
| 213 | phenylacetyl | 4 | no | 0 | 654 |

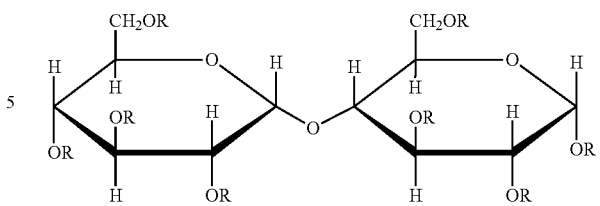

TABLE 3

| Compound | Substituent 1 | | Substituent 2 | | Molecular Weight |
| | type | degree of substitution | type | degree of substitution | |
|---|---|---|---|---|---|
| 301 | acetyl | 6 | benzoyl | 2 | 803 |
| 302 | acetyl | 6 | benzyl | 2 | 775 |
| 303 | acetyl | 6 | phenylacetyl | 2 | 831 |
| 304 | benzoyl | 2 | no | 0 | 551 |
| 305 | benzyl | 2 | no | 0 | 522 |
| 306 | phenylacetyl | 2 | no | 0 | 579 |

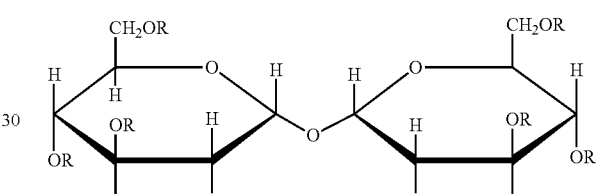

TABLE 4

| Compound | Substituent 1 | | Substituent 2 | | Molecular Weight |
| | type | degree of substitution | type | degree of substitution | |
|---|---|---|---|---|---|
| 401 | acetyl | 6 | benzoyl | 2 | 803 |
| 402 | acetyl | 6 | benzyl | 2 | 775 |
| 403 | acetyl | 6 | phenylacetyl | 2 | 831 |
| 404 | benzoyl | 2 | no | 0 | 551 |
| 405 | benzyl | 2 | no | 0 | 523 |
| 406 | phenyl ester | 2 | no | 0 | 579 |

Preferably, the film of the invention contains the sugar ester compound in an amount of from 2 to 30% by mass relative to the cellulose acylate therein, more preferably from 5 to 20% by mass, even more preferably from 5 to 15% by mass.

In case where the film contains the after-mentioned additive having a negative intrinsic birefringence along with the sugar ester compound, the amount of the sugar ester compound (part by mass) relative to the amount of the additive having a negative intrinsic birefringence (part by mass) is preferably from 2 to 10 times (ratio by mass), more preferably from 3 to 8 times (ratio by mass).

In case where the film contains the after-mentioned polyester-type plasticizer along with the sugar ester compound, the amount of the sugar ester compound (part by mass) relative to the amount of the polyester-type plasticizer (part by mass) is preferably from 2 to 10 times (ratio by mass), more preferably from 3 to 8 times (ratio by mass).

One or more different types of sugar ester compounds mentioned above may be used in the film of the invention either singly or as combined therein.

(Other Additive than Sugar Ester Compound)

The film of the invention may contain any other additive capable of being added to ordinary cellulose acylate films, than the above-mentioned sugar ester compound.

The additive includes, for example, an additive having a negative intrinsic birefringence, other plasticizer than the above-mentioned sugar ester compound, fine particles, retardation enhancer, antioxidant, thermal degradation inhibitor, colorant, UV absorbent, etc.

As those additives, preferably used herein are the compounds described in WO2008-126535.

(1) Additive Having Negative Intrinsic Birefringence:

The film of the invention may contain an additive having a negative intrinsic birefringence. Compounds having a negative intrinsic birefringence usable herein as the additive having a negative intrinsic birefringence are described below.

The compound having a negative intrinsic birefringence means a material that exhibits a negative intrinsic birefringence in a cellulose acylate film in a specific direction of the film. In this description, the property of negative intrinsic birefringence means that the compound has double refractive indices. Whether or not the compound has a negative intrinsic birefringence could be known, for example, by measuring the birefringence of a film to which the compound is added and that of another film to which the compound is not added, using a birefringence meter, followed by comparing the data with each other.

The compound having a negative intrinsic birefringence for use in the invention is not specifically defined. Any known compound having a negative intrinsic birefringence can be used here. For example, preferred are the compounds disclosed in JP-A 2010-46834, [0036] to [0092].

The compound having a negative intrinsic birefringence includes a polymer having a negative intrinsic birefringence and needle-like fine particles having a negative intrinsic birefringence (including needle-like fine particles of a polymer having a negative intrinsic birefringence). The polymer having a negative intrinsic birefringence usable in the invention is described below.

The polymer having a negative intrinsic birefringence is a polymer of such that, when a layer thereof with monoaxially-ordered molecular alignment receives light running thereinto, the refractive index of the light in the alignment direction is smaller than the refractive index of the light in the direction perpendicular to the alignment direction.

The polymer having such a negative intrinsic birefringence may be a negative polymer, for example, including a polymer having a specific cyclic structure (discotic ring such as aliphatic-aromatic ring or heteroaromatic ring) in the side chain (for example, styrenic polymer such as polystyrene, poly(4-hydroxy)styrene, styrene-maleic anhydride copolymer, as well as polyvinylpyridine), a (meth)acrylic polymer such as polymethyl methacrylate, a cellulose ester polymer (excluding those having a positive birefringence), a polyester polymer (excluding, those having a positive birefringence), an acrylonitrile polymer, an alkoxysilyl polymer, and their polynary (binary, ternary or the like) copolymers. One or more such polymers may be employable here either singly or as combined. The copolymers may be block copolymers or random copolymers.

Of those, preferred are a polymer having a specific cyclic structure, a (meth) acrylic polymer and an alkoxysilyl polymer; and more preferred are polystyrene, polyhydroxystyrene, polyvinylpyridine and (meth)acrylic polymer.

Adding a polymer having a specific cyclic structure to the cellulose acylate film is preferred as increasing the Rth of the film.

As the polymer having a specific cyclic structure, preferred for use herein are the polymers having an aliphatic-aromatic ring in the side chain described in JP-A 2010-46834. Of those, more preferred are polystyrene and poly(4-hydroxy)styrene; and even more preferred is a copolymer of polystyrene and poly(4-hydroxy)styrene. The copolymerization ratio (by mol) of the copolymer of polystyrene and poly(4-hydroxy)styrene is preferably from 10/90 to 100/0, more preferably from 20/80 to 90/10.

As the polymer having a specific cyclic structure, also preferred for use herein is a polymer having a heteroaromatic ring in the side chain such as polyvinylpyridine, etc.

When a (meth)acrylic polymer is added to the cellulose acylate film, the film may have extremely excellent transparency and its moisture permeability is extremely small, and the film exhibits excellent properties as a protective film for polarizer. As the (meth)acrylic polymer, preferred for use herein are the compounds described in JP-A 2009-1696 and WO2008-126535. The (meth)acrylic polymer may have an aliphatic-aromatic ring or a heteroaromatic ring in the side chain.

In case where the compound having a negative intrinsic birefringence is a polymer having a negative intrinsic birefringence, its weight-average molecular weight is preferably from 500 to 100,000, more preferably from 700 to 50,000, even more preferably from 700 to 10,000.

The polymer having a molecular weight of at least 500 and the polymer having a molecular weight of at most 100,000 are both good, since the former is well volatile and the latter is well compatible with cellulose acylate resin and the polymers secure good formation of cellulose acylate films.

Preferably, the compound having a negative intrinsic birefringence is added to the film of the invention in an amount of from 0 to 20% by mass of the cellulose acylate, more preferably from 0 to 15% by mass, even more preferably from 0 to 10% by mass.

On the other hand, inc case where the film of the invention is produced according to the production method of the invention mentioned below and even when the film does not contain such a relatively expensive compound having a negative intrinsic birefringence, the film may have good reversed wavelength dispersion characteristics of retardation. Accordingly, the amount of the compound having a negative intrinsic birefringence to be added to the film of the invention is preferably smaller from the viewpoint of reducing the production cost.

(2) Other Plasticizer than Sugar Ester Compound:

Any other plasticizer than the sugar ester compound may be added to the film of the invention.

As the other plasticizer, for example, preferred are a phosphate-type plasticizer, a phthalate-type plasticizer, a trimellitate-type plasticizer, a pyromellitate-type plasticizer, a polyalcohol-type plasticizer, a glycolate-type plasticizer, a citrate-type plasticizer, a polyester-type plasticizer (such as fatty acid-terminated polyester-type plasticizer, aromatic ring-containing polyester-type plasticizer), a carboxylate-type plasticizer, an acrylic polymer, etc.

The other plasticizer for use in the invention is preferably a polyester-type plasticizer having a number-average molecular weight of from 300 to less than 2000 in order that it does not cause haze of the film and it does not bleed out or evaporate from the film.

Not specifically defined, the polyester-type plasticizer preferably has an aromatic ring or a cycloalkyl ring in the molecule.

For example, an aromatic-terminated polyester-type plasticizer represented by the following formula (2) is preferred.

$$B^1\text{-}(G^1\text{-}A^1)n\text{-}G^1\text{-}B^1 \qquad (2)$$

wherein $B^1$ represents a benzenemonocarboxylic acid residue, $G^1$ represents an alkylene glycol residue having from 2 to 12 carbon atoms, or an arylglycol residue having from 6 to 12 carbon atoms, or an oxyalkylene glycol residue having from 4 to 12 carbon atoms, $A^1$ represents an alkylenedicarboxylic acid residue having from 4 to 12 carbon atoms, or an aryldicarboxylic acid residue having from 6 to 12 carbon atoms, and n indicates an integer of 1 or more.

The compound represented by the formula (2) is composed of a benzenemonocarboxylic acid residue represented by $B^1$, an alkylene glycol residue or an oxyalkylene glycol residue or an arylglycol residue represented by $G^1$, and an alkylenedicarboxylic acid residue or an aryldicarboxylic acid residue represented by $A^1$.

The benzenemonocarboxylic acid component of the polyester-type plasticizer for use in the invention includes, for example, benzoic acid, para-tertiary butyl-benzoic acid, ortho-toluic acid, meta-toluic acid, para-toluic acid, dimethylbenzoic acid, ethylbenzoic acid, normal propylbenzoic acid, aminobenzoic acid, acetoxybenzoic acid, etc. One or more of these may be used either singly or as combined.

The alkylene glycol component having from 2 to 12 carbon atoms of the polyester-type plasticizer preferred for use in the invention includes ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, etc. One or more these glycols may be used here either singly or as combined.

The alkylene glycol having from 2 to 12 carbon atoms is especially preferred as having excellent compatibility with cellulose acylate.

The oxyalkylene glycol component having from 4 to 12 carbon atoms of the polyester-type plasticizer preferred for use in the invention includes, for example, diethylene glycol, triethylene glycol, tetraethylene glycol, dipropylene glycol, tripropylene glycol, etc. One or more these glycols may be used here either singly or as combined.

The alkylenedicarboxylic acid component having from 4 to 12 carbon atoms of the polyester-type plasticizer preferred for use in the invention includes, for example, succinic acid, maleic acid, fumaric acid, glutaric acid, adipic acid, azelaic acid, sebacic acid, dodecanedicarboxylic acid, etc. One or more of these may be used either singly or as combined.

The arylenedicarboxylic acid component having from 6 to 12 carbon atoms includes phthalic acid, terephthalic acid, isophthalic acid, 1,5-naphthalenedicarboxylic acid, 1,4-naphthalenedicarboxylic acid, etc.

The number-average molecular weight of the polyester-type plasticizer for use in the invention preferably falls within a range of from 300 to 1500, more preferably from 400 to 1000.

Preferably, the acid value of the plasticizer is at most 0.5 mg KOH/g and the hydroxyl value thereof is at most 25 mg KOH/g, and more preferably the acid value is at most 0.3 mg KOH/g and the hydroxyl value is at most 15 mg KOH/g.

As the polyester-type plasticizer for use in the invention, also preferred are the polymers described in JP-A 2010-46834, [0141] to [0156].

The polyester-type plasticizer may be produced through ordinary polycondensation. For example, the polyester may be produced with ease according to any of (i) a thermal melt condensation method of direct reaction of a dibasic acid and a glycol, or polyesterification or interesterification of the above-mentioned dibasic acid or its alkyl ester, for example, a methyl ester of the dibasic acid and a glycol, or (ii) a method of dehydrohalogenation of a chloride of the acid and a glycol. Preferably, the polyester-type plasticizer for use in the invention is produced through direct reaction.

A polyester-type plasticizer having a high distribution profile in the low-molecular weight side is extremely highly compatible with cellulose acylate, and can therefore provide a cellulose acylate film having a small moisture permeability and excellent in transparency.

For controlling the molecular weight of the polymer, any known method is employable with no limitation. For example, though depending on the polymerization condition, the molecular weight of the polymer can be controlled by adding a monovalent acid or a monoalcohol in a method of terminating the polymer with the monovalent compound.

In this case, a monovalent acid is preferred from the viewpoint of the stability of the polymer. For example, acetic acid, propionic acid, butyric acid or the like is usable. Of those, preferably selected for use in the invention is one which does not go out of the system during polycondensation reaction but which, after the reaction, can be readily removed from the system. A mixture of these acids may also be used.

In the direct reaction, the timing of stopping the reaction may be computed from the amount of water to be formed during the reaction whereby the number-average molecular weight of the polymer to be produced can be controlled. In addition, by specifically defining the molar number of the glycol or the dibasic acid to be fed into a reactor, or by controlling the reaction temperature, the molecular weight of the polymer can be controlled.

The molecular weight of the polyester-type plasticizer for use in the invention can be determined according to GPC as mentioned above or according to a method of terminal quantification (hydroxyl value).

Preferably, the film of the invention contains the other plasticizer than the sugar ester compound such as the polyester-type plasticizer in an amount of from 1 to 40% by mass of the cellulose acylate therein, more preferably from 5 to 15% by mass.

(Nitrogen-Containing Aromatic Compound-Type Plasticizer)

The film of the invention may contain a nitrogen-containing aromatic compound-type plasticizer having, as the mother nucleus thereof, any of pyridine, pyrimidine, triazine or purine and having, as a substituent to be at any substitutable position of the mother nucleus, any of an alkyl group, an alkenyl group, an alkynyl group, an amino group, an amide group (this means a structure of an acyl group bonding to the compound via an amide bond), an aryl group, an alkoxy group, a thioalkoxy group, an alkyl or arylthio group (an alkyl group or an aryl group bonding to the compound via a sulfur atom), or a heterocyclic group. The substituent of the mother nucleus of the nitrogen-containing aromatic compound-type plasticizer may be further substituted with any other substituent, and the other substituent is not specifically defined. For example, in case where the mother nucleus is substituted with an amino group, the amino group may be substituted with one or more alkyl groups (in which the alkyl groups may bond to each other to form a ring), or with —SO₂R' (R' means a substituent).
Specific examples of the nitrogen-containing aromatic compound-type plasticizer are mentioned below, to which, however, the invention should not be restricted.
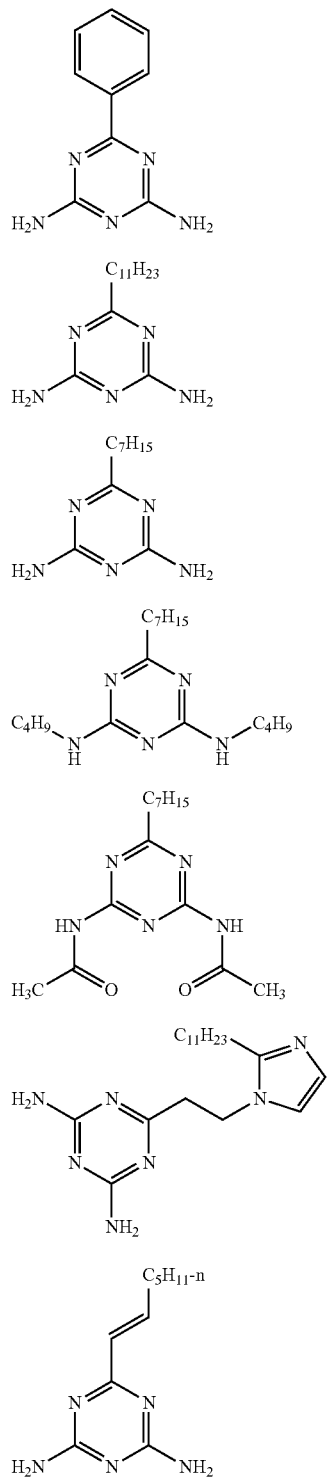
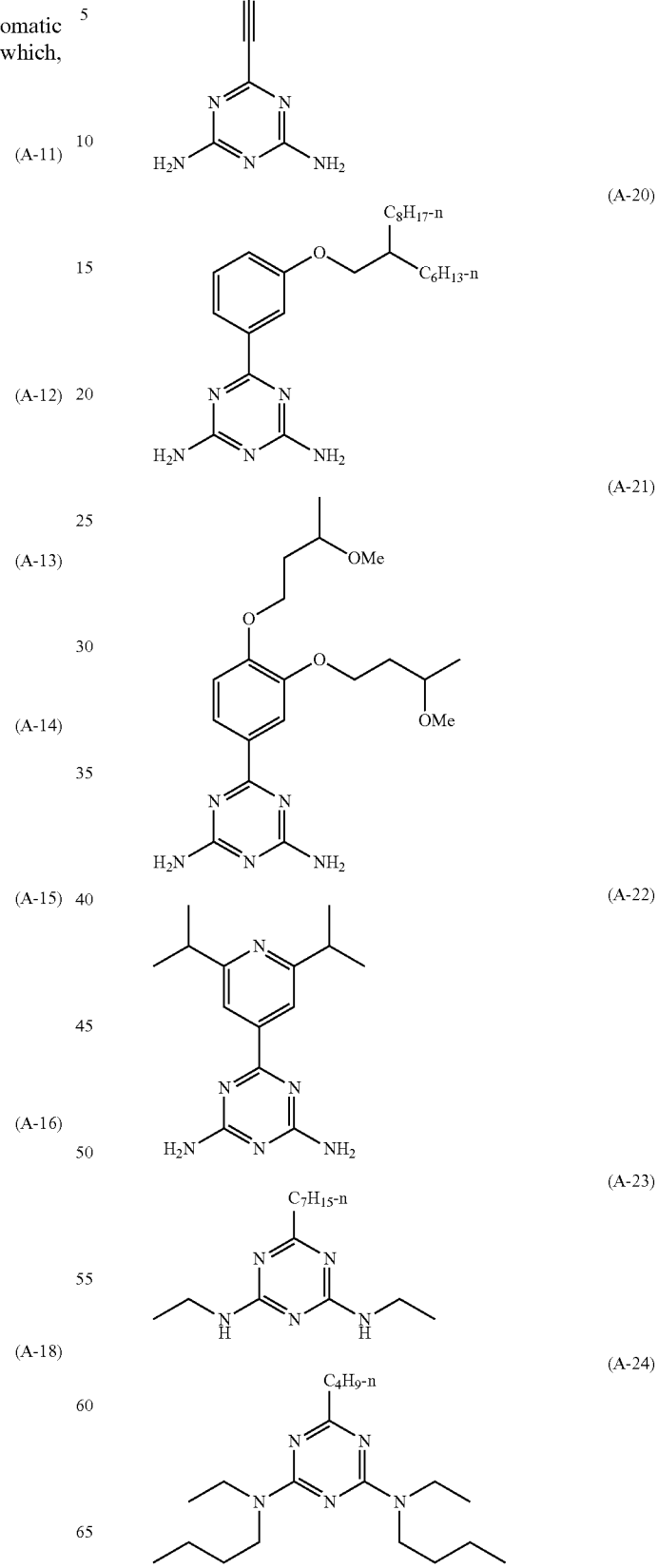

(A-25) 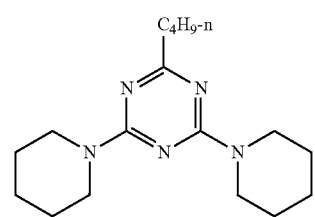
(A-26) 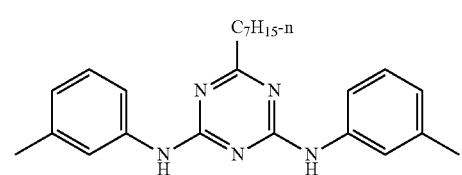
(A-27) 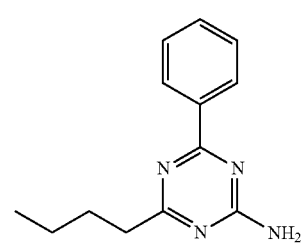
(A-31) 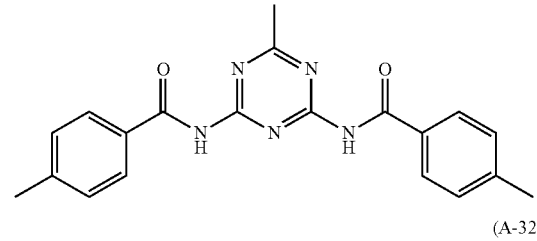
(A-32) 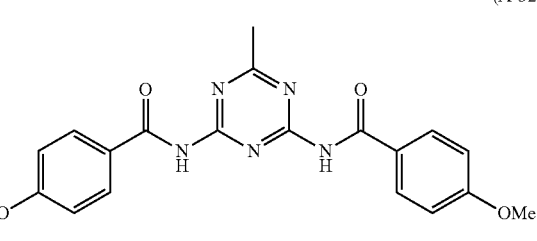
(A-33) 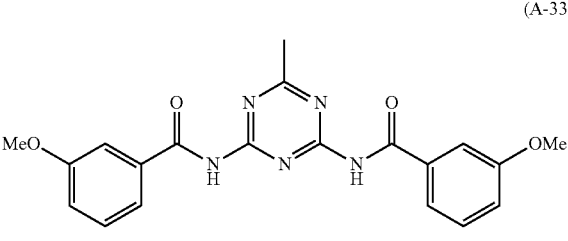
(A-34) 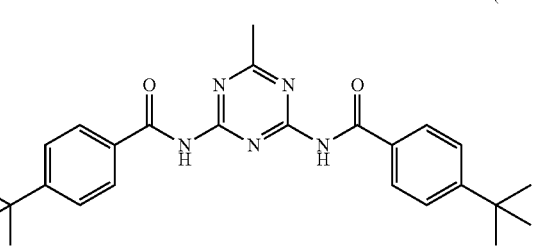
(A-35) 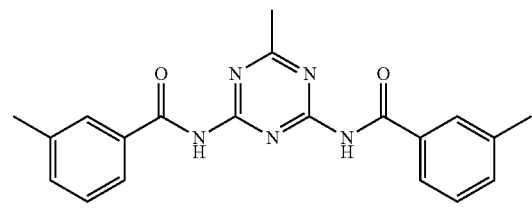
(A-36) 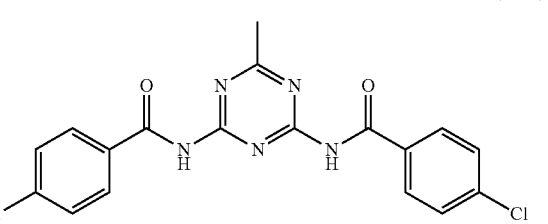
(A-37) 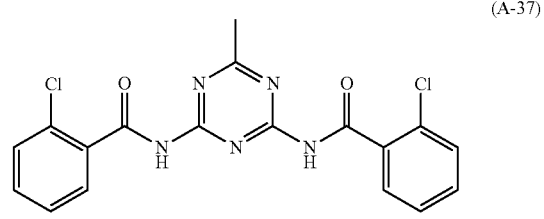
(A-38) 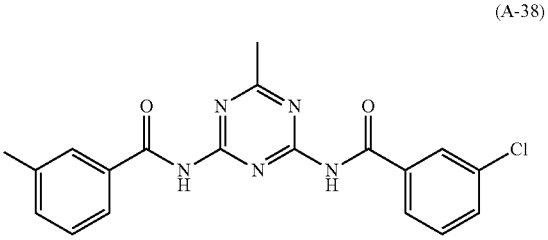
(A-39) 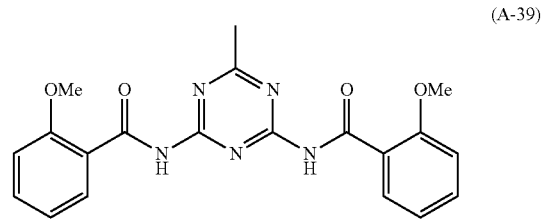
(A-40) 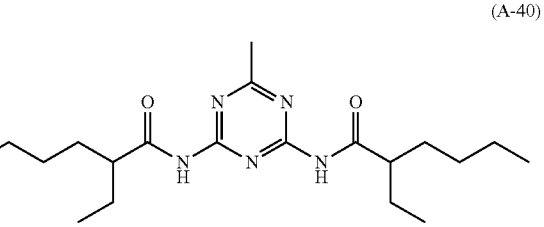
(A-41) 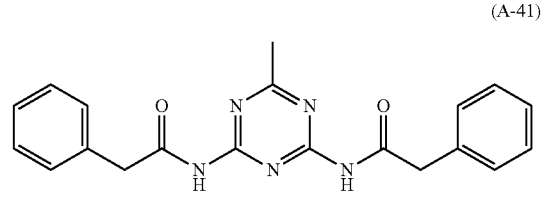

(A-42)

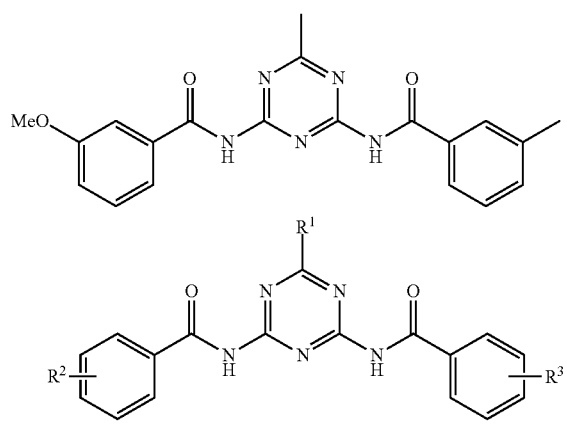

wherein R¹ to R³ are R¹ to R³, respectively, in the following compounds C-101 to C-180.

| Compound | R¹ | R² | R³ |
|---|---|---|---|
| C-101 | morpholin-N-yl—* | H | H |
| C-102 | | o-Me | o-Me |
| C-103 | | m-Me | m-Me |
| C-104 | | p-Me | p-Me |
| C-105 | | o-OMe | o-OMe |
| C-106 | | m-OMe | m-OMe |
| C-107 | | p-OMe | p-OMe |
| C-108 | | p-t-Bu | p-t-Bu |
| C-109 | | m-Cl | m-Cl |
| C-110 | | m-F | m-F |
| C-111 | MeO—* | H | H |
| C-112 | | o-Me | o-Me |
| C-113 | | m-Me | m-Me |
| C-114 | | p-Me | p-Me |
| C-115 | | p-OMe | p-OMe |
| C-116 | | m-OMe | m-OMe |
| C-117 | | p-OMe | p-OMe |
| C-118 | | p-t-Bu | p-t-Bu |
| C-119 | | m-Cl | m-Cl |
| C-120 | | m-F | m-F |
| C-121 | EtO—* | H | H |
| C-122 | | o-Me | o-Me |
| C-123 | | m-Me | m-Me |
| C-124 | | p-Me | p-Me |
| C-125 | | o-OMe | o-OMe |
| C-126 | | m-OMe | m-OMe |
| C-127 | | p-OMe | p-OMe |
| C-128 | | p-t-Bu | p-t-Bu |
| C-129 | | m-Cl | m-Cl |
| C-130 | | m-F | m-F |
| C-131 | n-PrO—* | H | H |
| C-132 | | o-Me | o-Me |
| C-133 | | m-Me | m-Me |
| C-134 | | p-Me | p-Me |
| C-135 | | o-OMe | o-OMe |
| C-136 | | m-OMe | m-OMe |
| C-137 | | p-OMe | p-OMe |
| C-138 | | p-t-Bu | p-t-Bu |
| C-139 | | m-Cl | m-Cl |
| C-140 | | m-F | m-F |
| C-141 | H₂N—* | H | H |
| C-142 | | o-Me | o-Me |
| C-143 | | m-Me | m-Me |
| C-144 | | p-Me | p-Me |
| C-145 | | o-OMe | o-OMe |
| C-146 | | m-OMe | m-OMe |
| C-147 | | p-OMe | p-OMe |
| C-148 | | p-t-Bu | p-t-Bu |
| C-149 | | m-Cl | m-Cl |
| C-150 | | m-F | m-F |
| C-151 | MeNH—* | H | H |
| C-152 | | o-Me | o-Me |
| C-153 | | m-Me | m-Me |
| C-154 | | p-Me | p-Me |
| C-155 | | o-OMe | o-OMe |
| C-156 | | m-OMe | m-OMe |
| C-157 | | p-OMe | p-OMe |
| C-158 | | p-t-Bu | p-t-Bu |
| C-159 | | m-Cl | m-Cl |
| C-160 | | m-F | m-F |
| C-161 | EtNH—* | H | H |
| C-162 | | o-Me | o-Me |
| C-163 | | m-Me | m-Me |
| C-164 | | p-Me | p-Me |
| C-165 | | o-OMe | o-OMe |
| C-166 | | m-OMe | m-OMe |
| C-167 | | p-OMe | p-OMe |
| C-168 | | p-t-Bu | p-t-Bu |
| C-169 | | m-Cl | m-Cl |
| C-170 | | m-F | m-F |
| C-171 | n-PrNH—* | H | H |
| C-172 | | o-Me | o-Me |
| C-173 | | m-Me | m-Me |
| C-174 | | p-Me | p-Me |
| C-175 | | o-OMe | o-OMe |
| C-176 | | m-OMe | m-OMe |
| C-177 | | p-OMe | p-OMe |
| C-178 | | p-t-Bu | p-t-Bu |
| C-179 | | m-Cl | m-Cl |
| C-180 | | m-F | m-F | wherein R² and R³ are R² and R³, respectively, in the following compounds C-181 to C-190.

| Compound | R² | R³ |
|---|---|---|
| C-181 | H | H |
| C-182 | o-Me | o-Me |
| C-183 | m-Me | m-Me |
| C-184 | p-Me | p-Me |
| C-185 | o-OMe | o-OMe |
| C-186 | m-OMe | m-OMe |
| C-187 | p-OMe | p-OMe |
| C-188 | p-t-Bu | p-t-Bu |
| C-189 | m-Cl | m-Cl |
| C-190 | m-F | m-F |

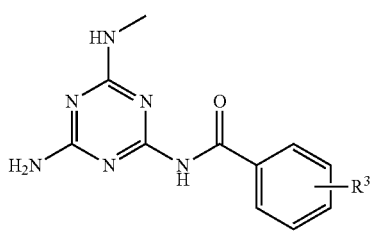
wherein R³ is R³ in the following compounds D-101 to D-110.
| Compound | R³ |
|---|---|
| D-101 | H |
| D-102 | o-Me |
| D-103 | m-Me |
| D-104 | p-Me |
| D-105 | o-OMe |
| D-106 | m-OMe |
| D-107 | p-OMe |
| D-108 | p-t-Bu |
| D-109 | m-Cl |
| D-110 | m-F |
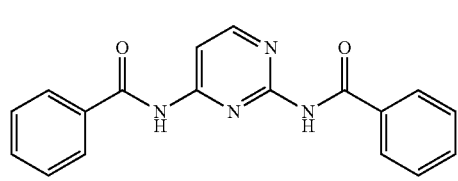
E-101
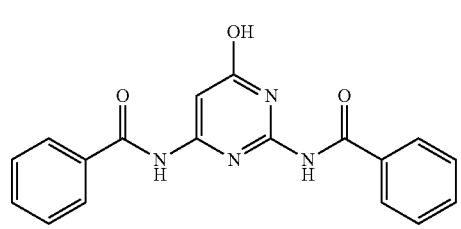
E-102
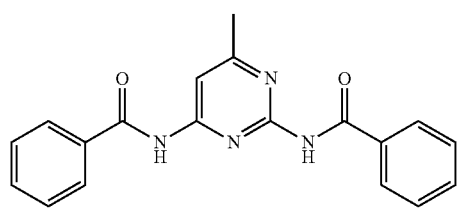
E-103
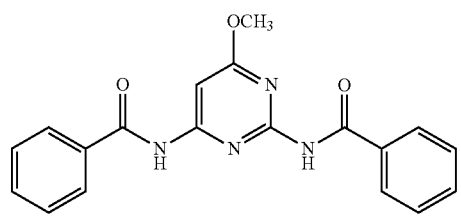
E-104
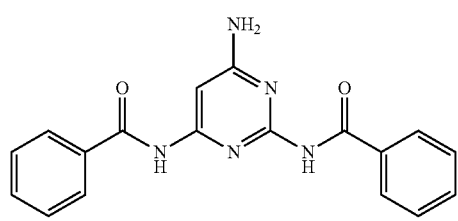
E-105
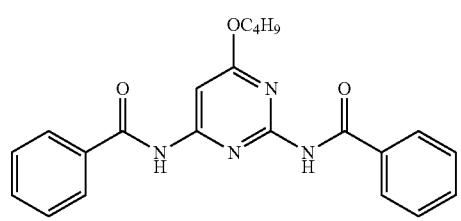
E-106
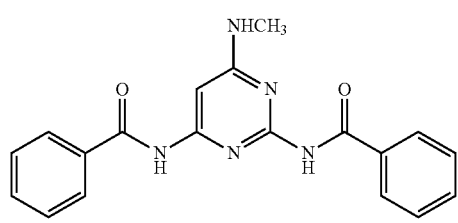
E-107
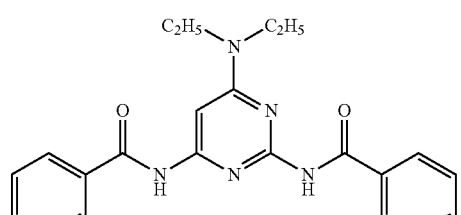
E-108
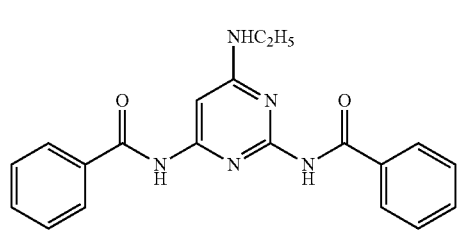
E-109
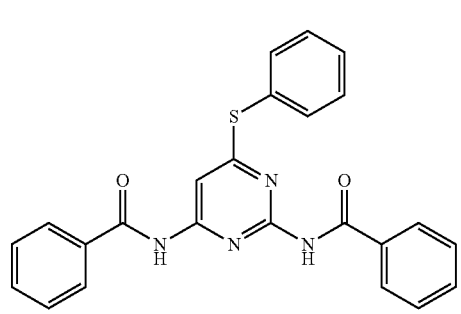
E-110

-continued
E-111
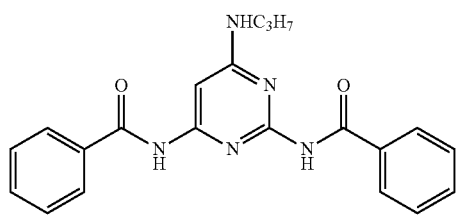
E-112
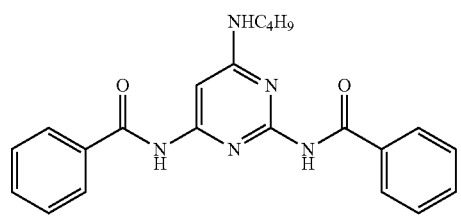
E-113
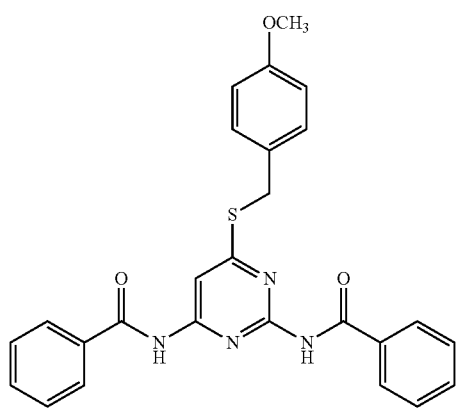
E-201
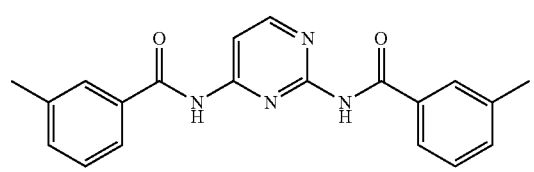
E-202
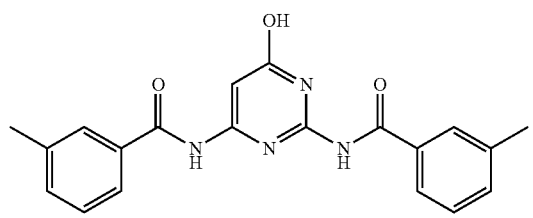
E-203
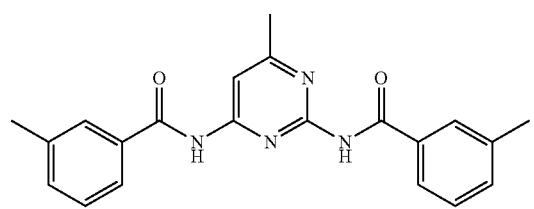
E-204
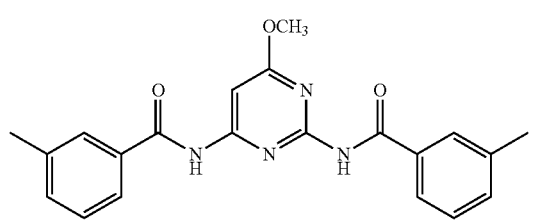
E-205
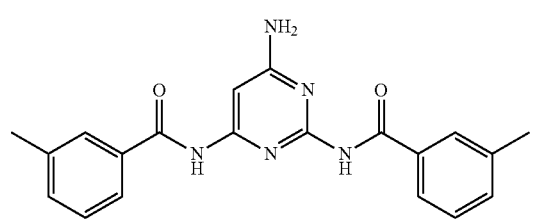
E-206
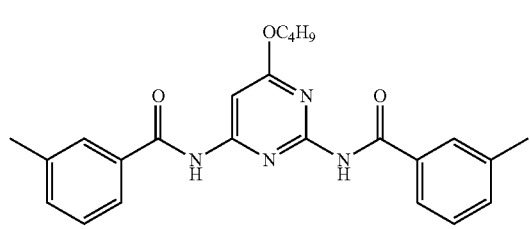
E-207
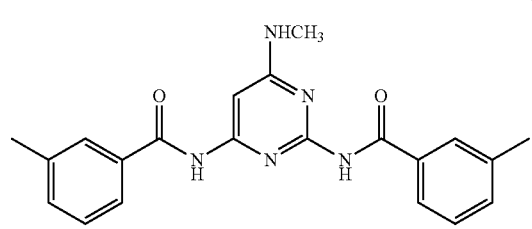
E-208
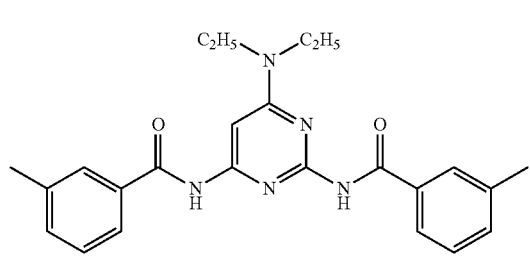
E-209
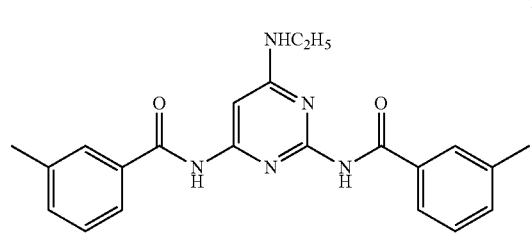

-continued
E-210
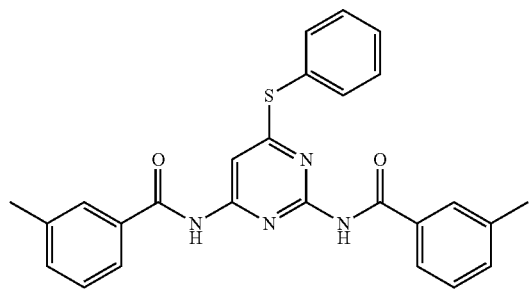
E-211
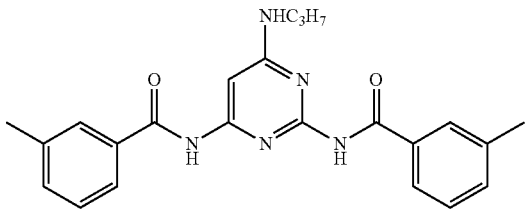
E-212
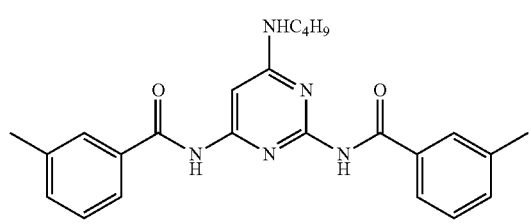
E-213
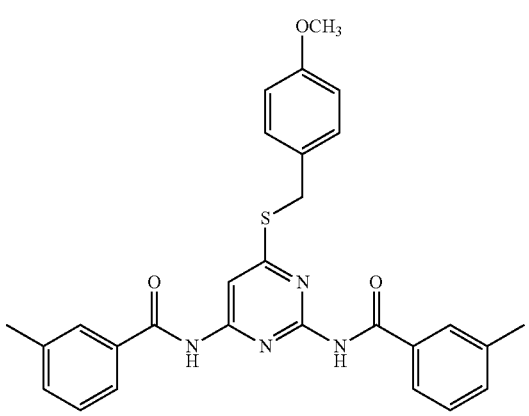
E-301
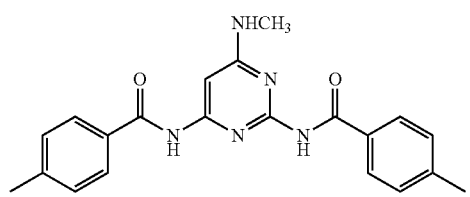
E-302
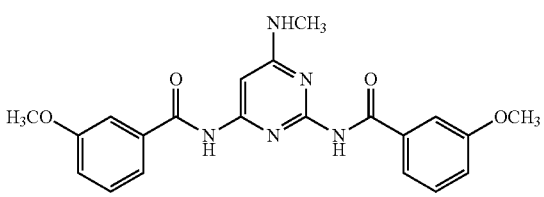
E-303
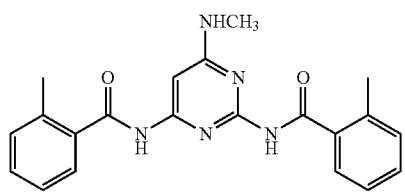
E-304
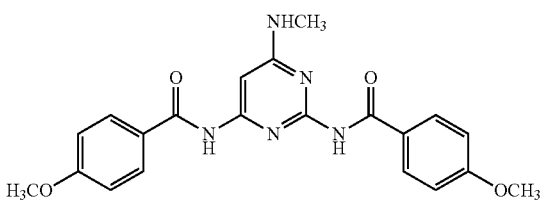
E-305
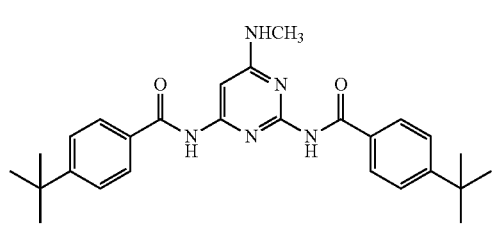
E-306
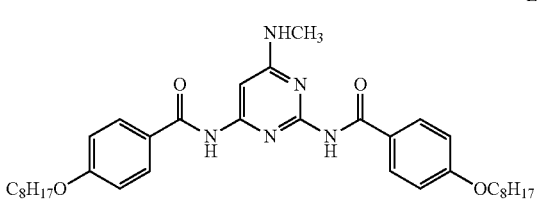

-continued
E-307
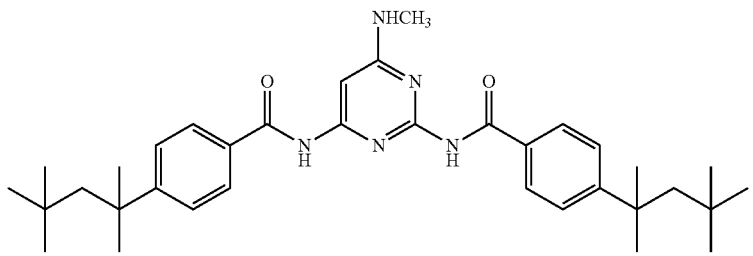
E-308
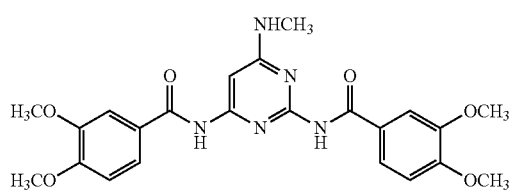
E-309
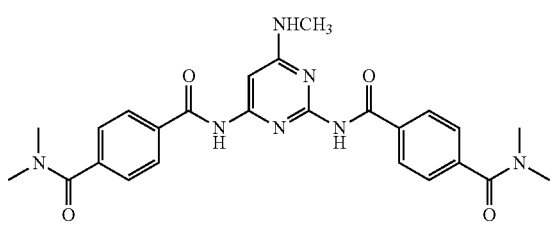
E-310
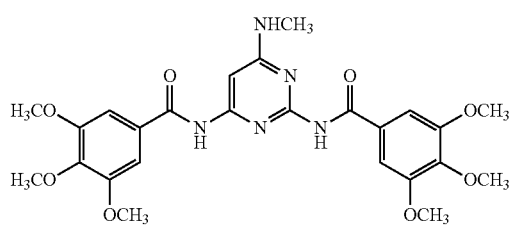
E-311
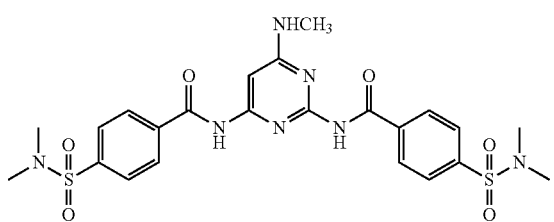
E-401
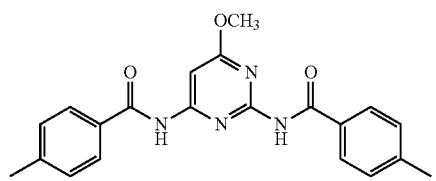
E-402
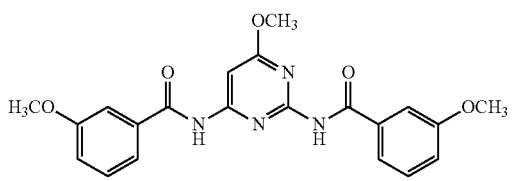
E-403
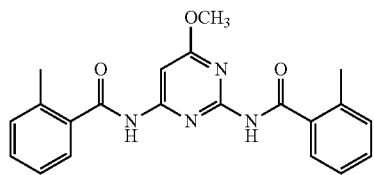
E-404
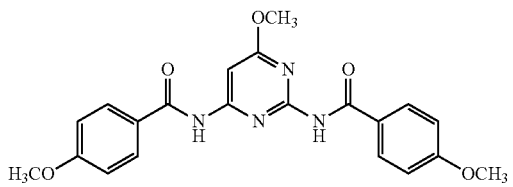
E-405
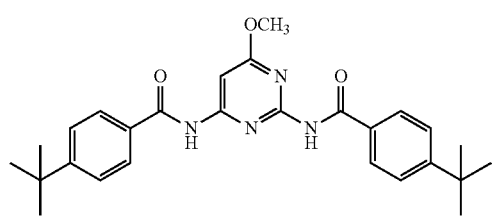
E-406
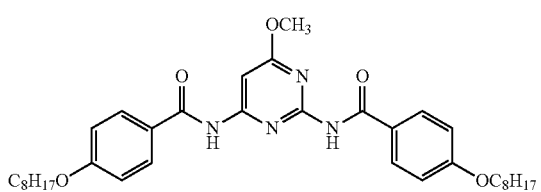

-continued
E-407
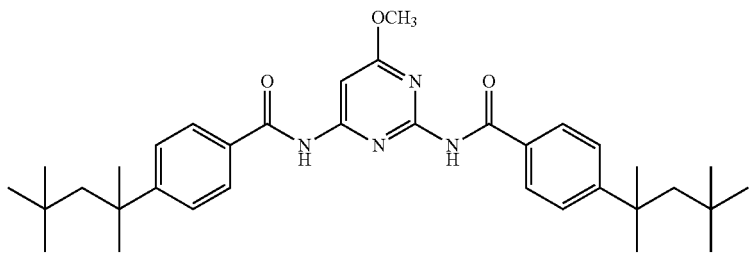
E-408
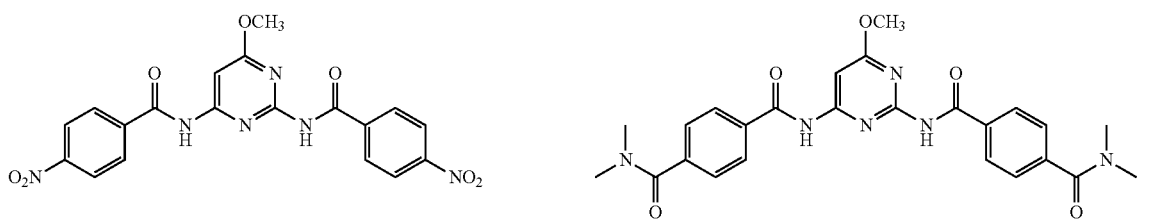
E-409
E-410
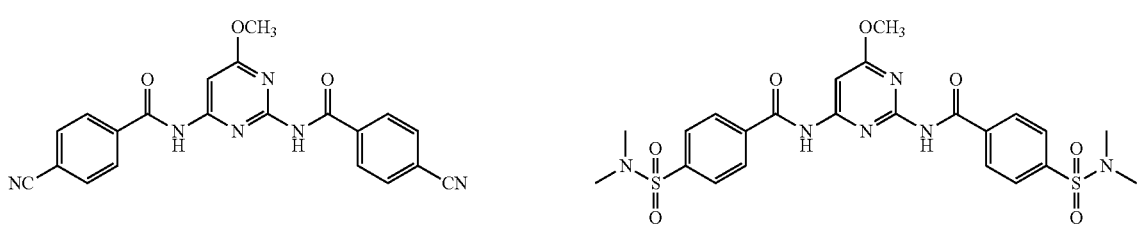
E-411
E-412
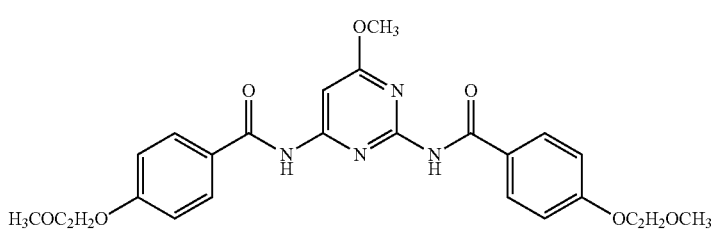
E-501
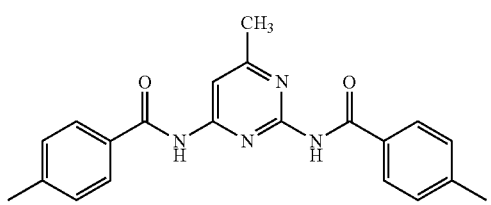
E-502
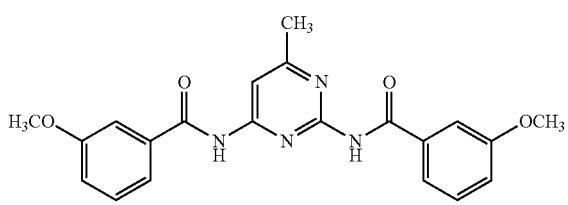
E-503
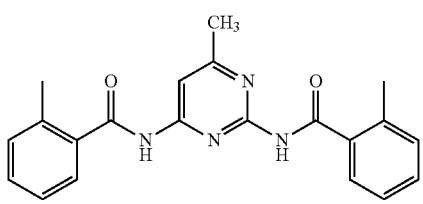
E-504
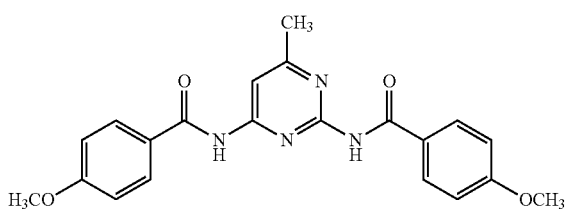

-continued
E-505
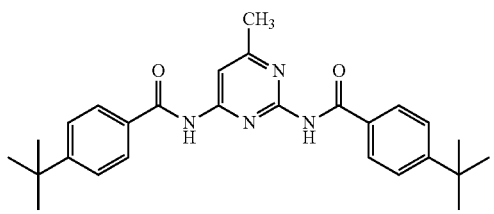
E-506
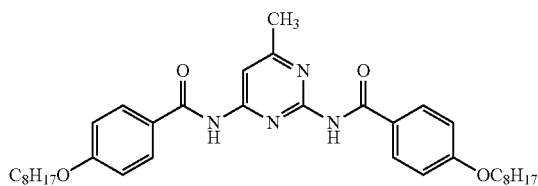
E-507
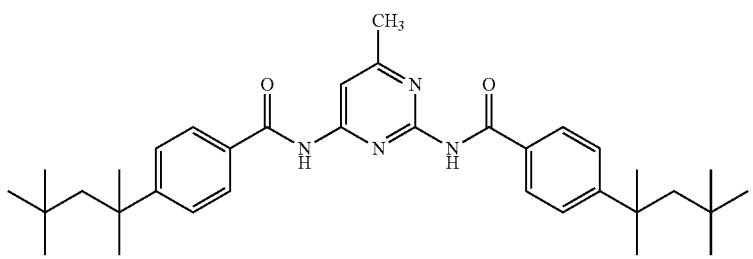
E-508
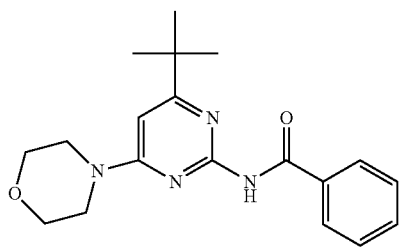
E-509
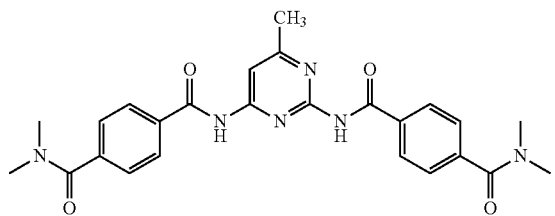
E-510
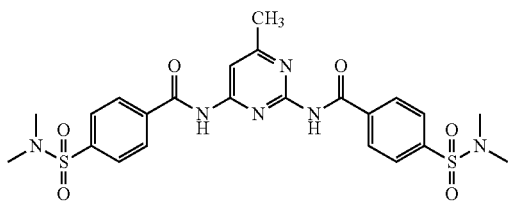
E-601
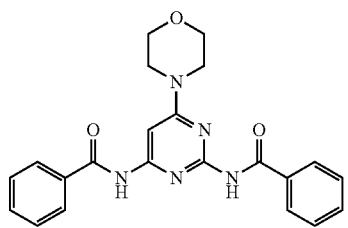
E-602
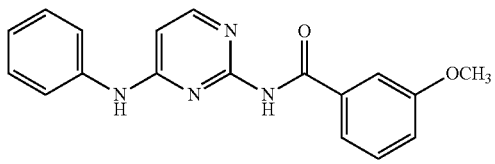
E-603
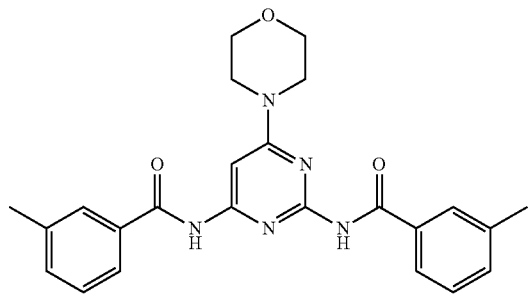

-continued
E-604
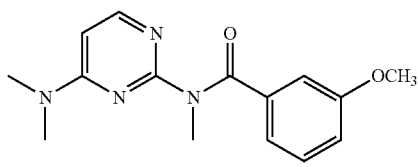
E-605
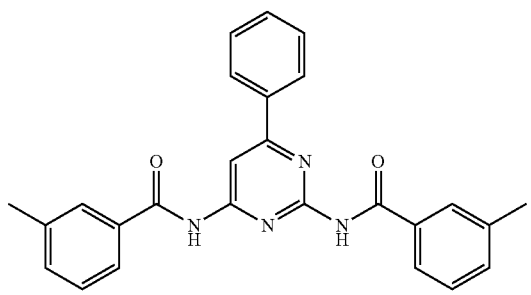
E-606
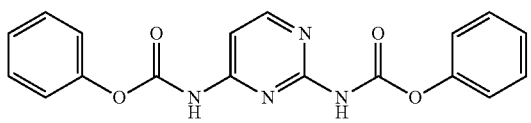
E-607
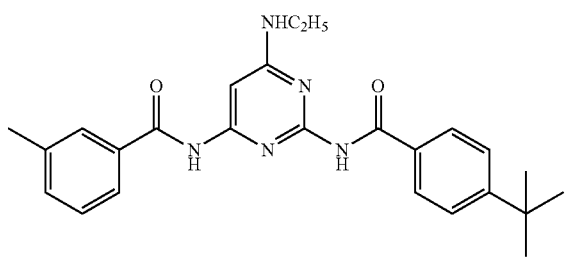
E-608
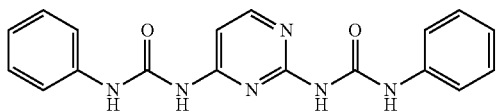
E-609
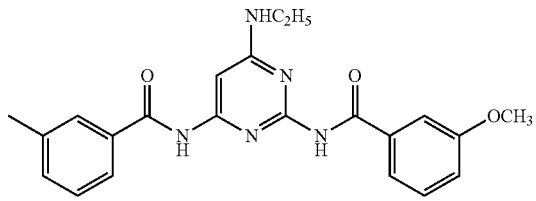
E-610
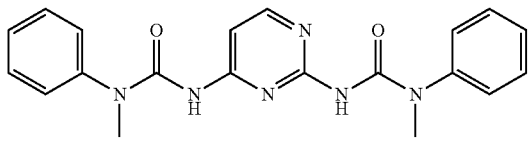
E-611
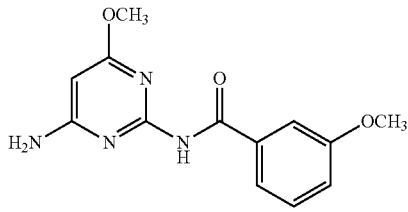
E-612
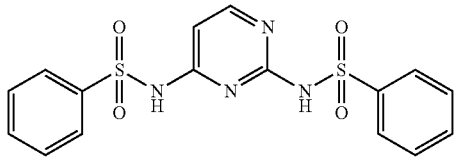
E-701
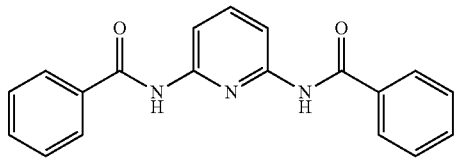
E-701
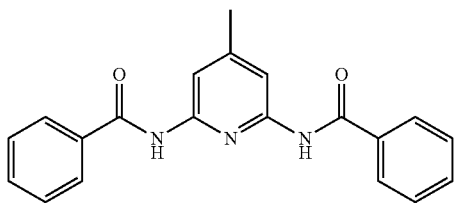
E-702
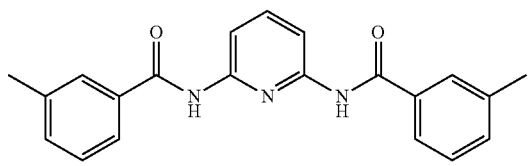

-continued
E-703
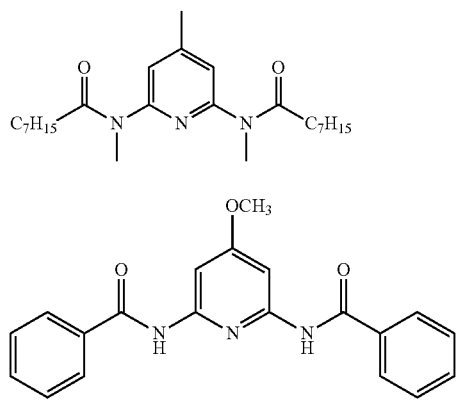
E-704
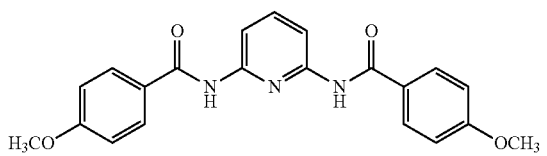
E-705
E-706
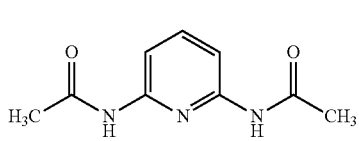
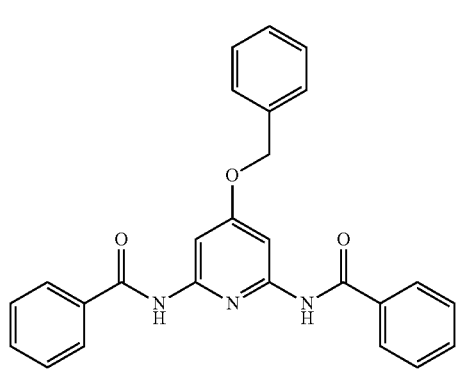
E-707
E-708
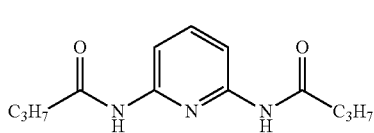
E-709
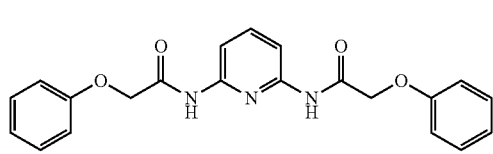
(F-101)
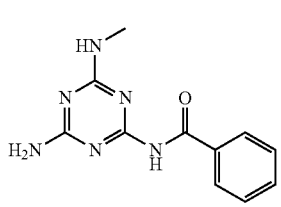
(F-102)
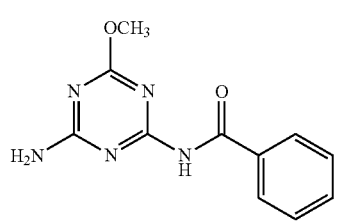
(F-103)
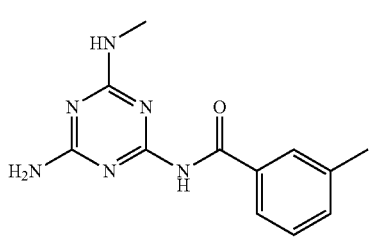
(F-104)
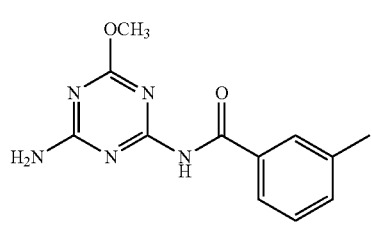
(F-105)
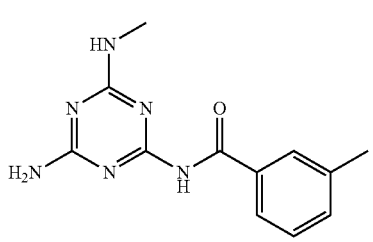

-continued
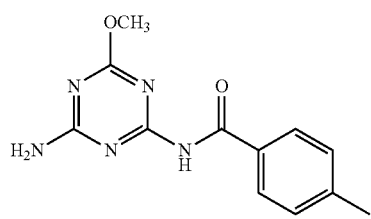 (F-106)
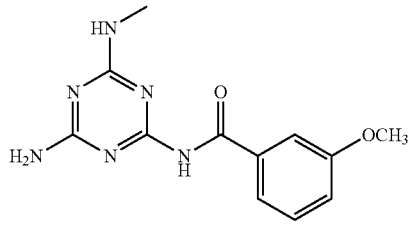 (F-107)
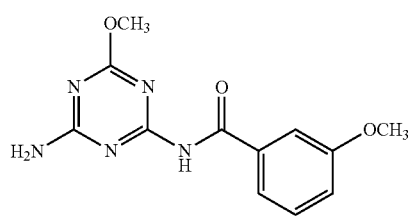 (F-108)
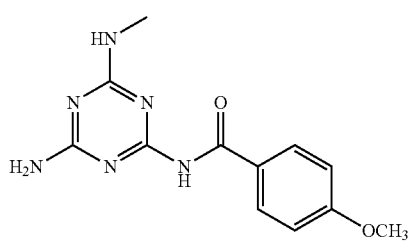 (F-109)
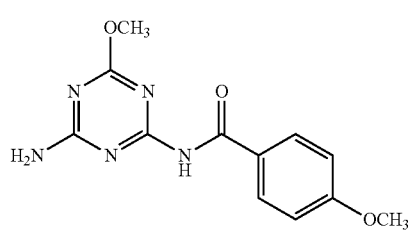 (F-110)
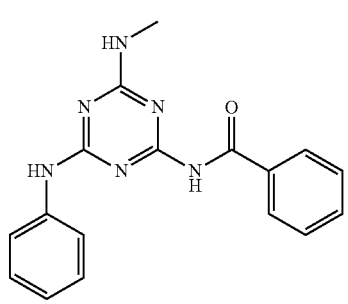 (F-111)
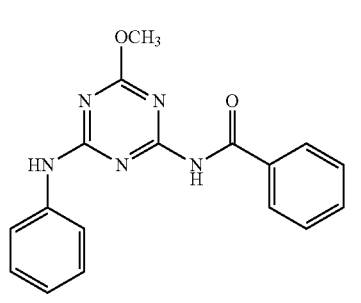 (F-112)
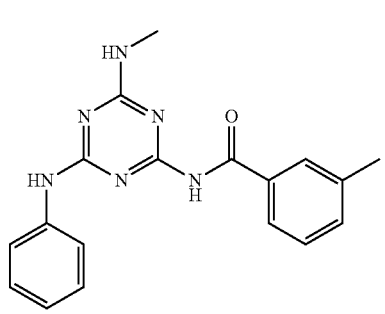 (F-113)
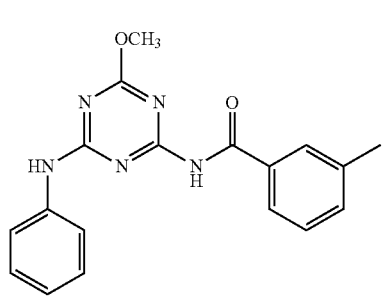 (F-114)
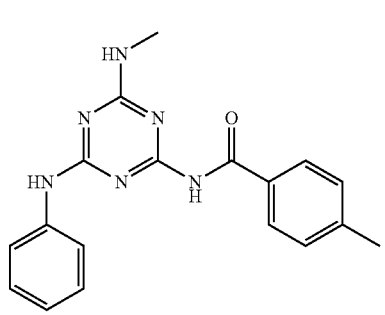 (F-115)

-continued
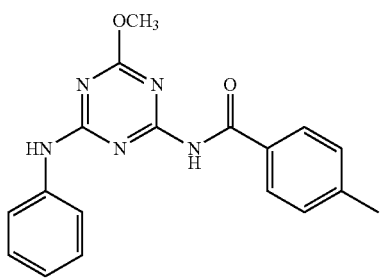
(F-116)
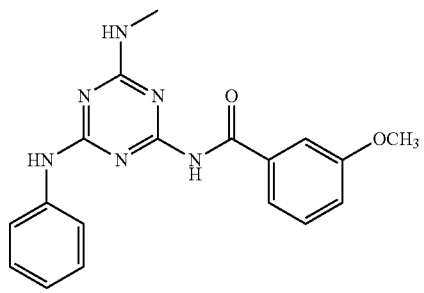
(F-117)
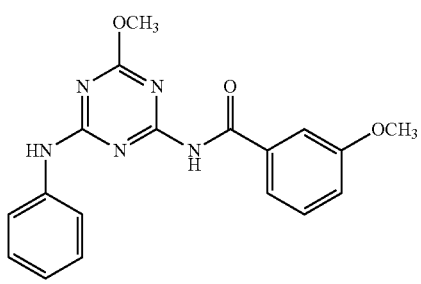
(F-118)
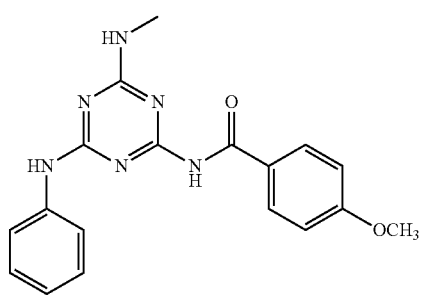
(F-119)
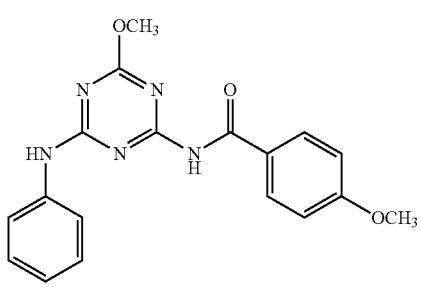
(F-120)
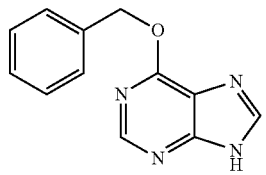
(G-101)
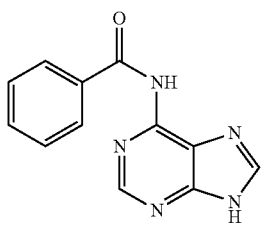
(G-102)
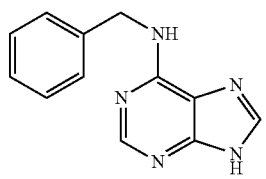
(G-103)
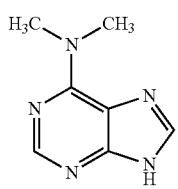
(G-104)
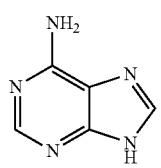
(G-105)
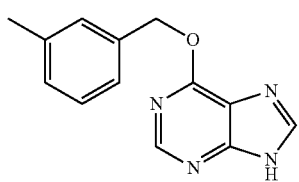
(G-106)
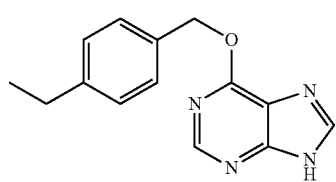
(G-107)

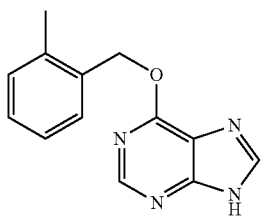
(G-108)

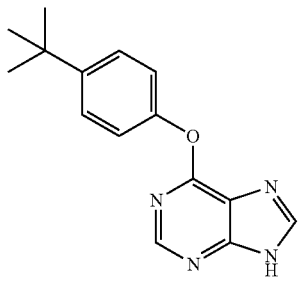
(G-110)

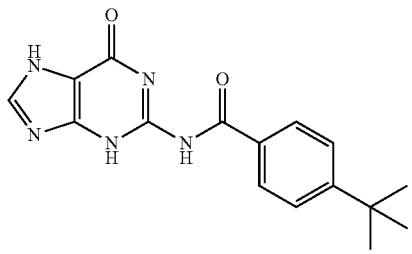
(H-102)

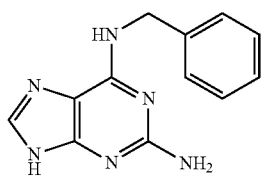
(H-104)

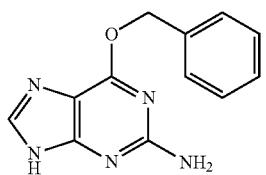
(H-106)

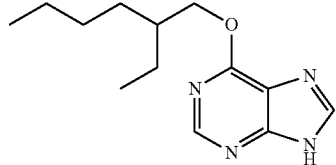
(G-109)

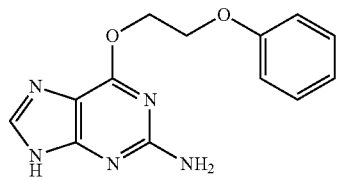
(H-101)

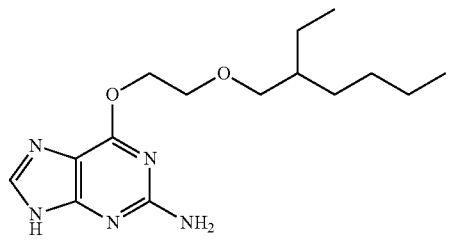
(H-103)

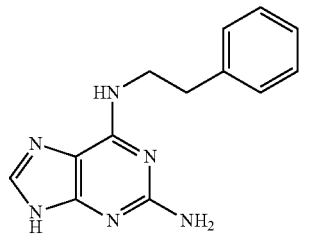
(H-105)

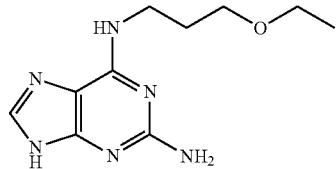
(H-107)

(3) Fine Particles:

An inorganic compound or a polymer is usable as the fine particles for use in the invention. Examples of the inorganic compound include silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate and calcium phosphate.

As the fine particles, preferred are those containing silicon as reducing the haze of the film, and more preferred is silicon dioxide.

Preferably, the fine particles have a primary particle size of from 5 to 50 nm, more preferably from 7 to 20 nm.

Preferably, the fine particles are in the film mainly as secondary aggregates thereof having a particle size of from 0.05 to 0.3 μm.

As the fine particles of silicon dioxide, for example, usable are commercial products of Aerosil R972, R972V, R974, R812, 200, 200V, 300, R202, OX50 and TT600, NAX50 (all by Nippon Aerosil).

Fine particles of zirconium oxide are sold on the market as trade names of Aerosil R976 and R811 (by Nippon Aerosil), and these can be used here.

Examples of the polymer include silicone resin, fluororesin and acrylic resin. Silicone resin is preferred, and more preferred is one having a three-dimensional network structure. For example, Tospearl 103, 105, 108, 120, 145, 3120 and 240 are sold as commercial products (all by Toshiba Silicone), and these are usable herein.

Of those, Aerosil 200V and Aerosil 972V are especially preferred as more effectively lowering the friction coefficient of the cellulose derivative film with keeping the haze of the film low.

The content of the fine particles relative to the cellulose acylate in the cellulose film of the invention is preferably from 0.05 to 1% by mass, more preferably from 0.1 to 0.5% by mass. In case where the film is a multilayered cellulose derivative film produced according to a co-casting method, the film contains the fine particles in that content preferably in the surface thereof.

(4) Retardation Enhancer:

The film of the invention may contain a retardation enhancer. Containing a retardation enhancer, the film can exhibit high retardation even though stretched at a low draw ratio. On the other hand, when the film of the invention is produced according to the production method of the invention to be mentioned below, the film can secure good retardation even though not containing a retardation enhancer.

The type of the retardation enhancer is not specifically defined. The retardation enhancer includes rod-shaped compounds or compounds having a cyclic structure such as a cycloalkane or aromatic ring, and the above-mentioned non-phosphate compounds having the ability to enhance retardation. As the cyclic structure-having compounds, preferred are discotic compounds. As the rod-shaped or discotic compounds, compounds having at least two aromatic rings are preferred as the retardation enhancer for use herein.

Two or more different types of retardation enhancers may be used here as combined.

Preferably, the retardation enhancer has a maximum absorption in a wavelength region of from 250 to 400 nm, more preferably substantially not having an absorption in a visible region.

As the retardation enhancer, for example, usable are the compounds described in JP-A 2004-50516 and 2007-86748 and the compounds described in JP-A 2010-46834, to which, however, the invention is not limited.

As the discotic compound for use herein, for example, preferred are the compounds described in EP 0911656-A2, the triazine compounds described in JP-A 2003-344655, and the triphenylene compounds described in JP-A 2008-150592, [0097] to [0108].

The discotic compounds usable herein may be produced according to known methods, for example, according to the method described in JP-A 2003-344655, the method described in JP-A 2005-134884, etc.

In addition to the above-mentioned discotic compounds, also preferred for use herein are rod-shaped compounds having a linear molecular structure; and for example, the rod-shaped compounds described in JP-A 2008-150592, [0110] to [0127] are preferred.

(5) Antioxidant, Thermal Degradation Inhibitor:

As an antioxidant and a thermal degradation inhibitor, any known ones are usable in the invention. In particular, preferred are lactone compounds, sulfur compounds, phenolic compounds, double bond-having compounds, hindered amines, phosphorus compounds. As the antioxidant and the thermal degradation inhibitor for use herein, preferred are the compounds described in WO2008-126535.

(6) Colorant:

The film of the invention may contain a colorant. Colorant generally includes dye and pigment; but in the invention, the colorant is meant to indicate a substance having an effect of making the liquid crystal panel have a bluish tone, or an effect of controlling the yellow index of the panel or reducing the haze thereof. As the colorant, preferred for use herein are the compounds described in WO2008-126535.

<Properties of Cellulose Acylate Film>

(Internal Haze)

The cellulose acylate film of the invention has an internal haze of at most 0.1%.

The haze means the haze value (%) measured according to JIS K7136.

The internal haze of the film of the invention is determined as follows: A few drops of glycerin are applied onto both surfaces of the cellulose acylate film to be analyzed, the film is sandwiched between two glass plates (MICRO SLIDE GLASS Lot No. S9213, by Matsunami) each having a thickness of 1.3 mm, and the haze value (%) of the sample is measured. On the other hand, a few drops of glycerin are put between two glass plates, and the haze value (%) thereof is measured. The latter value is subtracted from the former value to give the internal haze value (%) of the film sample.

The haze of the cellulose acylate film is measured with a haze meter (NDH2000, by Nippon Denshoku Kogyo). Briefly, a film sample to be analyzed is left in an environment at 23° C. and a relative humidity of 55% for 24 hours, and its haze is measured in the same environment.

Preferably, the internal haze of the cellulose acylate film of the invention is at most 0.05%, more preferably at most 0.04%.

In general, it is said that the haze of film is preferably smaller. However, merely low total haze of film is insufficient for increasing the front contrast of a display device, and the present inventors have controlled the internal haze of the film to fall within the above range and have succeeded in increasing the front contrast of a liquid crystal display device.

(Re, Rth)

Of the film of the invention, the in-plane retardation and the thickness-direction retardation at a wavelength of 550 nm satisfy the following formulae (1) and (2):

$$40 \text{ nm} \leq Re(550) \leq 60 \text{ nm} \quad (1)$$

wherein Re(550) means the in-plane retardation of the film at a wavelength of 550 nm, $$100 \text{ nm} \leq Rth(550) \leq 140 \text{ nm} \quad (2)$$

wherein Rth(550) means the thickness-direction retardation of the film at a wavelength of 550 nm.

Preferably, the film of the invention expresses the retardation, within the above range, from the viewpoint of improving the contrast of a liquid crystal display device and of reducing the color shift thereof at the time of black state.

Preferably, Re(550) is from 45 to 60 nm, more preferably from 48 to 60 nm.

Preferably, Rth(550) is from 105 to 135 nm, more preferably from 105 to 130 nm.

(Rth(550)/d)

Preferably, the film of the invention satisfies the following formula (6), from the viewpoint of satisfying both thickness reduction and sufficient Rth expression of the film and of reducing the material cost of the film.

$$1.5 \times 10^{-3} < Rth(550)/d \quad (6)$$

wherein Rth(550) means the thickness-direction retardation (unit: nm) of the film at a wavelength of 550 nm, and d means the thickness (unit: mm) of the film.

More preferably, Rth(550)/d is from 1.5 to $3.0 \times 10^{-3}$, even more preferably from 1.6 to $2.5 \times 10^{-3}$.

(Wavelength Dispersion Characteristics of Retardation)

Preferably, the film of the invention has reversed wavelength dispersion characteristics of retardation of such that the difference between the in-plane retardation thereof at a wavelength of 630 nm, Re(630), and the in-plane retardation thereof at a wavelength of 450 nm, Re(450), or that is, ΔRe (ΔRe=Re(630)−Re(450)) is positive, from the viewpoint that, when the film is incorporated in a liquid crystal display device, it could be more effective for reducing the color shift in the device at the time of black state.

Preferably, ΔRe/Re(550) of the film of the invention satisfies the following formula (4) from the same viewpoint as above.

$$0.02 \leq \Delta Re/Re(550) \leq 0.28 \quad (4)$$

$$\Delta Re = Re(630) - Re(450) \quad (4')$$

wherein Re(630) means the in-plane retardation of the film at a wavelength of 630 nm; Re(450) means the in-plane retardation of the film at a wavelength of 450 nm; Re(550) means the in-plane retardation of the film at a wavelength of 550 nm.

Also preferably, ΔRe/Re(550) of the film of the invention satisfies the following formula (5) from the viewpoint that, when the film is incorporated in a liquid crystal display device, it could be more effective for more remarkably reducing the color shift in the device at the time of black state.

$$0.11 \leq \Delta Re/Re(550) \leq 0.23 \quad (5)$$

$$\Delta Re = Re(630) - Re(450) \quad (5')$$

Preferably, the film of the invention is a biaxial optical compensatory film.

The biaxial optical compensatory film means that nx, ny and nz of the optical compensatory film all differ from each other, in which nx means the refractive index in the in-plane slow axis direction, ny means the in-plane refractive index in the direction perpendicular to nx, and nz means the refractive index in the direction perpendicular to nx and ny. More preferably in the invention, nx>ny>nz.

The film of the invention having the biaxial optical property is preferred in that, when it is incorporated in a liquid crystal display device, especially in a VA-mode liquid crystal display device and when the device is watched in an oblique direction, the problem of color shift can be reduced.

In this description, Re(λ) and Rth(λ) each mean the in-plane retardation and the thickness-direction retardation, respectively, of a film at a wavelength of λ. Unless otherwise specifically indicated in this description, the wavelength λ is 550 nm. Re(λ) is measured by applying a light having a wavelength of λ nm to a film sample in the normal direction of the film, using KOBRA 21ADH (by Oji Scientific Instruments). Rth(λ) is determined as follows: With the in-plane slow axis (determined by KOBRA 21ADH) taken as the tilt axis (rotation axis) of the film (in case where the film has no slow axis, the rotation axis of the film may be in any in-plane direction of the film), Re(λ) of the film is measured at 6 points in all thereof, from the normal direction of the film up to 50 degrees on one side relative to the normal direction thereof at intervals of 10°, by applying a light having a wavelength of λ nm from the tilted direction of the film. Based on the thus-determined retardation data of Re(λ), the assumptive mean refractive index and the inputted film thickness, Rth(λ) of the film is computed with KOBRA 21ADH. Apart from this, Re(λ) may also be measured as follows: With the slow axis taken as the tilt axis (rotation axis) of the film (in case where the film has no slow axis, the rotation axis of the film may be in any in-plane direction of the film), the retardation is measured in any desired two directions, and based on the thus-determined retardation data, the assumptive mean refractive index and the inputted film thickness, Rth is computed according to the following formulae (A) and (B). In this, for the assumptive mean refractive index, referred to are the data in Polymer Handbook (John Wiley & Sons, Inc.) or the data in the catalogues of various optical films. Films of which the mean refractive index is unknown may be analyzed with an Abbe's refractiometer to measure the mean refractive index thereof. Data of the mean refractive index of some typical optical films are mentioned below. Cellulose acylate (1.48), cycloolefin polymer (1.52), polycarbonate (1.59), polymethyl methacrylate (1.49), polystyrene (1.59). With the assumptive mean refractive index and the film thickness inputted thereinto, Kobra 21ADH can compute nx, ny and nz. From the thus-computed data nx, ny and nz, Nz=(nx−nz)/(nx−ny) is induced.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (A)$$

In this, Re(θ) means the retardation of the film in the direction tilted by an angle θ from the normal direction to the film; nx, ny and nz each mean the refractive index in each main axis direction of an index ellipsoid; and d means the thickness of the film.

$$Rth = ((nx+ny)/2 - nz) \times d \quad (B)$$

In this, the mean refractive index n is needed as the parameter, for which used are the data measured with an Abbe's refractiometer (Atago's "Abbe Refractiometer 2-T").

(Dimensional Change)

Of the film of the invention, the dimensional change before and after 24 hours at 60° C. and at a relative humidity of 90% satisfies the following formula (3) in the film conveying direction and in the direction perpendicular thereto:

$$-0.5\% \leq \{(L'-L0)/L0\} \times 100 \leq 0.5\% \quad (3)$$

wherein L0 means the length (unit: mm) of the film before aged for 24 hours at 60° C. and at a relative humidity of 90%; and L' means the length (unit: mm) of the film after aged for 24 hours at 60° C. and at a relative humidity of 90% and further after conditioned for 2 hours.

Preferably, the dimensional change of the film of the invention before and after 24 hours at 60° C. and at a relative humidity of 90% is at most 0.3% in the film conveying direction, more preferably at most 0.2%, even more preferably at most 0.1%.

Preferably, the dimensional change of the film of the invention before and after 24 hours at 60° C. and at a relative humidity of 90% is at most 0.4% in the direction perpendicular to the film conveying direction, more preferably at most 0.3%, even more preferably at most 0.2%.

(Glass Transition Temperature of Cellulose Acylate Film)

Not contradictory to the scope and the spirit of the invention, the glass transition temperature of the cellulose acylate film of the invention is not specifically defined.

The glass transition temperature of the unstretched cellulose acylate film of the invention may differ from the glass transition temperature of the stretched film. Unless otherwise specifically indicated, Tg referred to in the production method for the cellulose acylate film of the invention to be mentioned below means the glass transition temperature of the unstretched cellulose acylate film.

(Layer Constitution of Cellulose Acylate Film)

The film of the invention may be a single-layer film or may have a laminate structure of two or more layers, but is preferably a single-layer film.

(Film Thickness)

Preferably, the film of the invention has a thickness of from 20 to 90 μm from the viewpoint of reducing the production cost, more preferably from 30 to 90 μm, even more preferably from 40 to 80 μm, still more preferably from 40 to 70 μm. In case where the film of the invention is a laminate film, the overall film thickness preferably falls within the above range.

(Film Width)

Preferably, the film width of the invention is at least 1000 mm, more preferably at least 1500 mm, even more preferably at least 1800 mm.

[Production Method for Cellulose Acylate Film of the Invention]

The production method for the cellulose acylate film of the invention (hereinafter referred to as the production method of the invention) comprises a step of forming a polymer solution that comprises a cellulose acylate and a sugar ester compound containing from 1 to 12 pyranose structures or furanose structures where at least one hydroxyl group is esterified, into a film, a step of stretching the film, and a step of processing the stretched film for high temperature and high humidity treatment under the condition satisfying the following formulae (7) and (8):

$$70° C. \leq \text{temperature of the treatment} \leq 140° C. \quad (7)$$

$$250 \text{ g/m}^3 \leq \text{volumetric humidity of the treatment} \leq 400 \text{ g/m}^3 \quad (8)$$

The production method of the invention is described below.

The production method comprises formation of the above-mentioned cellulose acylate-containing film according to a solution casting method or a melt casting method. From the viewpoint of bettering the film surface condition, the production method preferably comprises a step of forming the cellulose acylate-containing film in a mode of solution casting film formation.

The production method of the invention is described below with reference to an embodiment of solution casting film formation; however, the invention is not limited to the mode of solution casting film formation. In case where the film of the invention is produced according to a melt casting method, any known method is employable.

<Polymer Solution>

In the solution casting film formation method, a polymer solution containing cellulose acylate and optionally various additives (cellulose acylate solution) is formed into a web. The polymer solution for use in the solution casting film formation method (hereinafter this may be referred to as cellulose acylate solution or dope) is described below.

(Solvent)

The cellulose acylate for use in the invention is dissolved in a solvent to form a dope, which is cast on a substrate to form a film thereon. In this step, the solvent must be evaporated away after extrusion or casting, and therefore, a volatile solvent is preferably used.

Further, the solvent is one not reacting with a reactive metal compound, a catalyst or the like and not dissolving the casting substrate. Two or more different types of solvents may be used here as combined.

As the case may be, a cellulose acylate and a hydrolyzable and polycondensable reactive metal compound may be dissolved in different solvents, and the resulting solutions may be mixed later.

An organic solvent capable of well dissolving the cellulose acylate is referred to as a good solvent, and an organic solvent exhibiting the main effect for the dissolution and used in a major amount is referred to as a main (organic) solvent.

Examples of the good solvent include ketones such as acetone, methyl ethyl ketone, cyclopentanone, cyclohexanone, etc.; ethers such as tetrahydrofuran (THF), 1,4-dioxane, 1,3-dioxolan, 1,2-dimethoxyethane, etc.; esters such as methyl formate, ethyl formate, methyl acetate, ethyl acetate, amyl acetate, γ-butyrolactone, etc.; as well as methyl cellosolve, dimethylimidazolinone, dimethylformamide, dimethylacetamide, acetonitrile, dimethyl sulfoxide, sulforane, nitroethane, methylene chloride, methyl acetacetate, etc. Preferred are 1,3-dioxolan, THF, methyl ethyl ketone, acetone, methyl acetate and methylene chloride.

Preferably, the dope contains from 1 to 40% by mass of an alcohol having from 1 to 4 carbon atoms, in addition to the above-mentioned organic solvent.

The alcohol serves as a gelling solvent in such a manner that, after the dope has been cast on a metal support, the solvent begins to evaporate and the proportion of the alcohol in the dope increases whereby the web (the dope film formed by casting the cellulose acylate dope on a support may be referred to as web) may be readily gelled and may be well peeled from the metal support. In case where the proportion of the alcohol is small, it may play a role in promoting the dissolution of cellulose acylate in a chlorine-free organic solvent, or may plays a role in retarding the gellation and precipitation of reactive metal compound and retarding the viscosity increase of the dope.

The alcohol having from 1 to 4 carbon atoms includes methanol, ethanol, n-propanol, iso-propanol, n-butanol, sec-butanol, tert-butanol, propylene glycol monomethyl ether, etc.

Of those, preferred is ethanol as having the advantages of excellent stability in dope, relatively low boiling point, good dryability and nontoxicity. These organic solvents do not have the ability to dissolve cellulose acylate by themselves and are therefore poor solvents.

The cellulose acylate to constitute the cellulose acylate film of the invention contains a hydroxyl group or a hydrogen-bonding functional group of esters, ketones or the like, and therefore it is desirable that the solvent contains an alcohol in an amount of from 5 to 30% by mass of the whole solvent, more preferably from 7 to 25% by mass, even more preferably from 10 to 20% by mass, from the viewpoint of reducing the film peeling load from the casting support.

Controlling the alcohol content could facilitate the of Re and Rth of the cellulose acylate film produced according to the production method of the invention. Concretely, when the alcohol content is increased, then the drying temperature (heat treatment temperature) before stretching in the production method of the invention to be mentioned below could be set relatively low, whereby the ultimate range of Re and Rth could be enlarged more.

In the invention, it is also effective to make the film contain a small amount of water for controlling the dope viscosity, for increasing the wet film strength in drying and for increasing the dope intensity in drum casting. For example, water may be in the dope in an amount of from 0.1 to 5% by mass of the whole dope, preferably from 0.1 to 3% by mass, more preferably from 0.2 to 2% by mass.

Examples of the combination of organic solvents preferred for use as the solvent for the polymer solution in the invention are described in JP-A 2009-262551.

If desired, a non-halogen organic solvent may be used as the main solvents, and its details are described in (No. 2001-1745, published by the Hatsumei Kyokai on Mar. 15, 2001).

The cellulose acylate concentration in the polymer solution in the invention is preferably from 5 to 40% by mass, more preferably from 10 to 30% by mass, most preferably from 15 to 30% by mass.

The cellulose acylate concentration can be so controlled that it could reach a predetermined level in the stage of dissolving cellulose acylate in a solvent. If desired, a solution having a low concentration (for example, having a concentration of from 4 to 14% by mass) is previously prepared, and it may be concentrated by evaporating the solvent. Also if desired, a high-concentration solution is previously prepared and it may be diluted. Adding an additive may lower the cellulose acylate concentration.

The time for additive addition may be suitably determined depending on the type of the additive.

The solvent that is most preferred for dissolving the polymer compound, cellulose acylate in a high concentration with satisfying the above condition is a mixed solvent of methylene chloride/ethyl alcohol of from 95/5 to 80/20. Alternatively, a mixed solvent of methyl acetate/ethyl alcohol of from 60/40 to 95/5 may be preferably used.

<Details of Processing Steps>

(1) Dissolution Step:

This is a step of dissolving a cellulose acylate in an organic solvent comprising mainly a good solvent for the cellulose acylate in a dissolver with stirring therein, to thereby form a dope, or a step of mixing an additive solution in a cellulose acylate solution to form a dope.

For dissolution of cellulose acylate, employable are various dissolution methods such as a method to be attained under normal pressure, a method to be attained at a temperature not higher than the boiling point of the main solvent, a method to be attained under pressure at a temperature not lower than the boiling point of the main solvent, a method of cooling dissolution as in JP-A 9-95544, 9-95557 or 9-95538, a method to be attained under high pressure as in JP-A 11-21379, etc. Especially preferred is the method to be attained under pressure at a temperature not lower than the boiling point of the main solvent.

Preferably, the cellulose acylate concentration in the dope is from 10 to 35% by mass. An additive is added to the dope during or after dissolution and is again dissolved and dispersed therein, then the resulting dope is filtered through a filtering material and defoamed, and thereafter fed to the next step with a feeding pump.

(2) Casting Step:

This is a step of feeding the dope to a pressure die via a feeding pump (for example, pressure metering pump), and casting the dope to the casting position of an endlessly running endless metal belt, for example, a stainless belt, or of a rotating metal support such as a metal drum or the like, through a pressure die slit.

Preferred is a pressure die of which the slit form of the nozzle can be regulated to facilitate uniform film thickness. The pressure die includes a coathanger die, a T-die and the like, any of which is favorably usable here. The surface of the metal support is mirror-finished. For increasing the film formation speed, two or more pressure dies may be provided for a metal support and the dope may be divided for multilayer formation. Multiple dopes may be simultaneously case according to a co-casting method to produce a laminate-structured film.

(3) Solvent Evaporation Step:

This is a step of heating the web (the precursor that is prior to a finished cellulose acylate film and contains much solvent is referred to as web) on the metal support so as to remove the solvent from the web to such a degree that the web can be released from the metal support.

For solvent evaporation, there may be employed a method of applying an air blow to the side of the web and/or a method of heating the back of the metal support with a heating liquid, a method of heating both the surface and the back of the web by radiation heat, etc. Preferred is the method of heating the back with a heating liquid, as securing good drying efficiency. Also preferred is combination of these methods. In the method of heating the back with a heating liquid, preferably, the back of the support is heated at a temperature not higher than the boiling point of the main solvent of the organic solvent used in the dope or of the organic solvent having the lowest boiling point.

(4) Peeling Step:

This is a step of peeling the web from which the solvent has been evaporated away on the metal support, at the peeling position. The peeled web is then fed to the next step. When the residual solvent amount (represented by the formula mentioned below) in the web to be peeled is too large, then the web may be difficult to peel, or on the contrary, when the web is too much dried on the metal support and then peeled, then a part of the web may be broken or cut along the way.

In this, as a method of increasing the film formation speed (in which the film formation speed may be increased by peeling the web at a time when the residual solvent amount is as large as possible), there may be mentioned a gel casting method. For example, there are a method of adding a poor solvent for cellulose acylate to the dope, then casting the dope and gelling it; and a method of gelling the dope with lowering the temperature of the metal support. The dope may be gelled on the metal support to thereby increase the strength of the film to be peeled, thereby increasing the film formation speed.

Preferably, the residual solvent amount in the web on the metal support in peeling the web is controlled to fall within a range of from 5 to 150% by mass, depending on the condition of the drying load intensity, the length of the metal support, etc. However, in case where the web is peeled at a time when the residual solvent amount therein is larger, the residual solvent amount in peeling will be determined in consideration of both the economical film formation speed and the film quality. In the invention, the temperature of the peeling position on the metal support is preferably from −50 to 40° C., more preferably from 10 to 40° C., most preferably from 15 to 30° C.

Preferably, the residual solvent amount in the web at the peeling position is from 10 to 150% by mass, more preferably from 10 to 120% by mass.

The residual solvent amount may be expressed by the following formula:

$$\text{Residual Solvent Amount (\% by mass)} = \{(M-N)/N\} \times 100$$

wherein M is the mass of the web at any point, and N is the mass of the web having the mass of M after dried at 110° C. for 3 hours.

(5) Drying or Heat Treatment Step, Stretching Step:

In the production method of the invention, preferably, the film is stretched at a temperature not higher than (Tg−5° C.) in the stretching step, from the viewpoint of increasing the optical appearance relative to the thickness of the cellulose acylate film to be obtained, or that is, increasing Rth(550)/d of the film (in which Tg means the glass transition temperature (unit: ° C.) of the unstretched cellulose acylate film). In particular, more preferably, the cellulose acylate film not heated at all at a temperature not lower than Tg−5° C. is stretched at a temperature not lower than Tg−5° C. in the stretching step.

After the peeling step, preferably, the web is dried in a drying unit where the web is led to alternately pass through multiple rolls disposed therein and/or in a tenter unit where the web is clipped at both sides thereof and conveyed therethrough.

In the production method of the invention, the web may be heat-treated or may not be heat-treated before stretched, but in case where the web is heat-treated, it is desirable that the web is not heated at all at a temperature not higher than Tg−5° C. where Tg is the glass transition temperature of the cellulose acylate film.

According to the conventional technique in WO2008-126535, the film capable of increasing the panel contrast when incorporated in a liquid crystal display device is produced by heating the unstretched cellulose acylate film at a temperature higher than the stretching temperature of the film, and in particular, the unstretched film is preferably heated at a temperature higher than the stretching temperature by 20° C. or more. When the film production method includes the heating step that is intrinsically unnecessary for stretching the film for retardation expression, then the fuel cost noticeably increases and the method may require some additional heating means or apparatus than the stretching apparatus. Accordingly, the conventional film for increasing the display panel contrast is unsatisfactory from the viewpoint of the production cost, and it is desired to lower the heat treatment temperature to thereby significantly reduce the production cost. However, the inventors' investigations have revealed that, when the heat treatment temperature for the film described in Examples in WO2008-126535 is lowered, then the display panel front contrast greatly lowers. Accordingly, the production cost for the conventional film capable of increasing the display panel contrast could not be lowered any more in view of the production process of the film.

In a preferred embodiment of the invention, even when the film is not heated at all at a temperature not lower than Tg−5° C. before stretched, the total haze and the internal haze of the film could be within the scope of the invention since in the film of the invention, the above-mentioned sugar ester compound is added to the cellulose acylate and since the film is stretched at the temperature mentioned below. Further, the film of the preferred embodiment of the invention can increase the panel contrast when incorporated in a liquid crystal display device even though the production cost is lower than before.

In heat treatment, if any, in the invention, the heat treatment temperature is preferably not higher than Tg−5° C., more preferably from Tg−20° C. to lower than Tg−5° C., even more preferably from Tg−15° C. to lower than Tg−5° C.

Also preferably, the heat treatment time is at most 30 minutes, more preferably at most 20 minutes, even more preferably at most 10 minutes or so.

For drying and heat treatment, in general, a hot air blow is applied to both surfaces of the web; but in place of air, a microwave may be applied thereto for heating. The temperature, the air blow amount and the time may vary depending on the solvent to be used; and suitable conditions may be selected in accordance with the type and the combination of the solvents to be used.

In the production method of the invention, the film may be stretched in any direction of the film conveying direction (hereinafter referred to as machine direction) or in the direction perpendicular to the film conveying direction (hereinafter referred to as lateral direction), but is preferably stretched in the lateral direction from the viewpoint of making the film express the desired retardation. More preferably, the film is stretched biaxially both in the machine direction and in the lateral direction. The stretching may be attained in one stage or in multiple stages.

Preferably, the draw ratio in stretching the film in the film conveying direction is from 0 to 20%, more preferably from 0 to 15%, even more preferably from 0 to 10%. The draw ratio (elongation) in stretching the cellulose acylate web may be attained by the peripheral speed difference between the metal support speed and the peeling speed (peel roll draw). For example, in case where an apparatus having two nip rolls is used, the rotation speed of the nip roll on the outlet side is made faster than that of the nip roll on the inlet side, whereby the cellulose acylate film may be stretched preferably in the conveying direction (machine direction). The stretching may control the retardation of the film.

"Draw ratio (%)" as referred to herein is computed according to the following formula:

$$\text{Draw Ratio (\%)} = 100 \times \{(\text{length after stretching}) - (\text{length before stretching})\}/(\text{length before stretching}).$$

The draw ratio in stretching the film in the direction perpendicular to the film conveying direction is preferably from more than 20% to 60%, more preferably from 25 to 55%, even more preferably from 25 to 50%.

In the method of stretching the film in the direction perpendicular to the film conveying direction in the invention, preferably used is a tenter apparatus.

In biaxially stretching the film, for example, the film may be relaxed by from 0.8 to 1.0 time in the machine direction to thereby make the film have the desired retardation. The draw ratio in stretching may be defined depending on the intended optical properties of the film. In producing the cellulose acylate film of the invention, the film may be monoaxially stretched in the machine direction.

In the production method of the invention, the stretching temperature is preferably not higher than Tg−5° C. The stretching within the range is hereinafter referred to as low-temperature stretching. Low-temperature stretching of the formed film is favorable as increasing the Rth of the film of the invention without increasing the film thickness, or that is, as increasing more Rth(550)/d of the film. Not adhering to any theory, the polymer and the additive in the film would be more hardly oriented during the low-temperature stretching than during high-temperature stretching, and therefore the film could express Re not lowering Rth thereof through the low-temperature stretching.

On the other hand, in case where an ordinary known cellulose acylate film is stretched in a mode of low-temperature stretching, its harmful results are that the dimensional change of the film in high temperature and high humidity environments may increase and the haze of the film may also increase. Not adhering to any theory, the harmful results would be caused because residual strain readily remains in film after the low-temperature stretching and some crazes are readily formed in the film during the low-temperature stretching.

As opposed to this, in the production method of the invention, the film is, after the stretching step, processed in the high temperature and high humidity treatment step under the specific condition to be mentioned below, in which, therefore, the residual strain generated through the low-temperature stretching can be released; and therefore in the method including the low-temperature stretching step, the effect of the invention can be well secured and the film produced can enjoy the effect of increasing the Rth through the low-temperature stretching treatment.

In a more preferred embodiment of the production method of the invention, a film of cellulose acetate having a low degree of acetyl substitution (especially cellulose acetate having a degree of acetyl substitution of from 2.0 to 2.6) is stretched in a mode of low-temperature stretching, whereby the film can be prevented from having a haze caused by the low-temperature stretching treatment. Not adhering to any theory, when a cellulose acetate having a low degree of acetyl substitution is used as the cellulose acylate in the invention, the cellulose acetate having a low degree of acetyl substitution has high compatibility with the above-mentioned sugar ester compound, and therefore it is expected that the two may disperse uniformly with no phase separation of the additives during low-temperature stretching. Accordingly, the stretching stress may be so controlled as to be uniformly given to the whole web, and the stretched film can be prevented from having crazes to be often formed during low-temperature stretching. As a result, the internal haze of the film produced according to the production method of the invention can be controlled to fall within the above-mentioned preferred range.

Preferably, the stretching temperature is from Tg–50° C. to Tg–5° C., more preferably from Tg–40° C. to Tg–5° C.

Apart from the definition by Tg of the unstretched film, the lowermost limit of the stretching temperature is preferably higher than 150° C., more preferably 160° C. or higher. The uppermost limit of the stretching temperature is preferably not higher than 170° C.

If desired, the film may be dried after the stretching step and before the high temperature and high humidity treatment step to be mentioned below. In case where the film is dried after the stretching step and before the high temperature and high humidity treatment step to be mentioned below, the drying temperature, the drying air blow amount and the drying time may vary depending on the solvent to be used, and may be suitably selected in accordance with the type and the combination of the solvents to be used. In the invention, preferably, the drying temperature after the stretching step and before the high temperature and high humidity treatment step to be mentioned below is lower than the stretching temperature in the stretching step, from the viewpoint of increasing the panel front contrast when the film is incorporated in a liquid crystal display device.

(6) High Temperature and High Humidity Treatment Step:

The production method of the invention includes a step of processing the stretched film for high temperature and high humidity treatment under the condition satisfying the following formulae (7) and (8):

$$70°\ C. \leq \text{temperature of the treatment} \leq 140°\ C. \tag{7}$$

$$250\ g/m^3 \leq \text{volumetric humidity of the treatment} \leq 400\ g/m^3 \tag{8}$$

In the above-mentioned preferred embodiment of the production method of the invention, the film processed through the low-temperature stretching treatment may have desired optical properties in some degree, however, the dimensional stability of the film in aging in high temperature and high humidity environments could not be still improved completely. Not adhering to any theory, when a film having a large dimensional change is incorporated in a liquid crystal display device, the problem to occur is caused by the irreversible change in the film dimension to occur when the device is kept in a condition at 60° C. and at a relative humidity of 90% for a long period of time. To solve the problem, the production method of the invention includes high temperature and high humidity treatment of the stretched film under the condition satisfying the above-mentioned formulae (7) and (8) to thereby positively generate irreversible change in the film being produced. As a result, when the cellulose acylate film produced according to the production method of the invention is mounted on a liquid crystal display device, it may prevent the generation of corner unevenness (display unevenness to occur in high temperature and high humidity treatment) in oblique directions to the liquid crystal display panel.

In a more preferred embodiment of the production method of the invention, a cellulose acetate having a low degree of acetyl substitution (especially a cellulose acetate having a degree of acetyl substitution of from 2.0 to 2.6) is used to enhance the optical appearance of the film and the reversed wavelength dispersion characteristic thereof. The cellulose acetate having such a low degree of acetyl substitution is more advantageous from the viewpoint of the optical appearance and the reversed wavelength dispersion characteristic, than a cellulose acetate propionate having the same degree of acyl substitution (hereinafter referred to as CAP) or than a cellulose acylate having any other acyl substituent than acetyl group and having the same degree of acyl substitution (for example, cellulose acetate phthalate described in JP-A 2009-1696). However, the cellulose acetate having a low degree of acetyl substitution has a higher water content than the cellulose acylate having any other acyl substituent than acetyl group and having the same degree of acyl substitution. Accordingly, in case where the cellulose acetate having a low degree of acetyl substitution is formed into a film, it is expected that the dimensional stability of the formed film would be worsened more. However, in the production method of the invention where a cellulose acetate having a low degree of acetyl substitution is used and where the stretched film is processed for high temperature and high humidity treatment under the specific condition satisfying the above-mentioned formulae (7) and (8), the film of the invention can secure its effect and the dimensional change thereof can be fully reduced. As a result, in case where the cellulose acylate film obtained in the more preferred embodiment of the production method of the invention is mounted on a liquid crystal display device, the display contrast of the liquid crystal display device can be further enhanced, the color shift in display panel can be reduced, and the generation of corner unevenness in oblique directions to the liquid crystal display panel (display unevenness to occur in high temperature and high humidity treatment) can be sufficiently prevented.

Preferably, the high temperature and high humidity treatment temperature is from higher than 70° C. to 125° C., more preferably from 80 to 120° C., even more preferably from 90 to 110° C. The high temperature and high humidity treatment temperature as referred to herein means the temperature of the cellulose acylate film that has been kept in contact with a contact vapor.

Preferably, the volumetric humidity in high temperature and high humidity treatment is from 280 to 390 g/m³, more preferably from 290 to 350 g/m³, even more preferably from 290 to 330 g/m³.

In a more preferred embodiment thereof, the production method of the invention is based on the finding that the high temperature and high humidity treatment of the cellulose acylate film having a low degree of substitution (concretely, cellulose acylate film having a degree of acyl substitution of from 2.0 to 2.6, especially cellulose acetate film having a degree of acetyl substitution of from 2.0 to 2.6) must be attained under a strictly controlled volumetric humidity condition. For example, when a volumetric humidity condition most suitable for a cellulose acylate film having a degree of acyl substitution of about 2.9 or so is applied to a low-substitution cellulose acylate film, then the film may be greatly stretched in the machine direction in the high temperature and high humidity treatment step.

To that effect, the preferred range of the high temperature and high humidity treatment temperature, the volumetric humidity and the relative humidity in the case of using a low-substitution cellulose acylate is the same as the preferred range in high temperature and high humidity treatment of cellulose acylate having no specific limitation on the degree of substitution therein.

The vapor (contact vapor) to be kept in contact with the cellulose acylate film in the high temperature and high humidity treatment step is a vapor containing water vapor, more preferably a vapor containing water vapor as the main ingredient thereof, even more preferably water vapor alone. The main ingredient of the vapor means that, when the vapor is a single vapor, the main ingredient is the single vapor itself, and when the vapor is composed of multiple vapors, the main ingredient is the vapor having the highest mass fraction of all the constitutive vapors.

Preferably, the contact vapor is formed in a wet vapor supply apparatus. Concretely, a solvent in the form of a solution is heated with a boiler to be a vapor, which is then fed with a blower. The contact vapor may be mixed with air, and after fed with a blower, it may be heated via a heating unit. In this, the air is preferably heated. Thus formed, the temperature of the contact vapor is preferably from 70 to 200° C., more preferably from 80 to 160° C., most preferably from 100 to 140° C. When the temperature is not higher than the uppermost limit, then it is favorable since the film is not too much curled; and when not lower than the lowermost limit, the contact vapor produces a sufficient effect.

Preferably, the relative humidity of the contact vapor is from 10% to 100%, more preferably from 15 to 100%, even more preferably from 20 to 100%.

Regarding the contact method between the cellulose acylate film and the above-mentioned contact vapor in the high temperature and high humidity treatment step, employable is a method of applying the contact vapor to the cellulose acylate film, a method of putting the cellulose acylate film in a space filled with the contact vapor, or a method of leading the film to pass through the space filled with the contact vapor. Of those, preferred is the method of applying the contact vapor to the cellulose acylate film, or the method of leading the film to pass through the space filled with the contact vapor. Preferably, the cellulose acylate film is kept in contact with the contact vapor with the film kept guided in the contact zone by zigzag-arranged plural rollers therein.

The contact time with the contact vapor is not specifically defined. Within the range capable of attaining the effect of the invention, the contact time is preferably as short as possible from the viewpoint of the production efficiency. The uppermost limit of the processing time is, for example, preferably at most 60 minutes, more preferably at most 10 minutes. On the other hand, the lowermost limit of the processing time is, for example, preferably at least 10 seconds, more preferably at least 30 seconds.

Not specifically defined, the temperature of the cellulose acylate film before brought into contact with the contact time is preferably from 80 to 130° C.

Not specifically defined, the residual solvent amount in the cellulose acylate film before the high temperature and high humidity treatment is preferably such that the cellulose acylate molecules have almost lost the flowability. Concretely, the residual solvent amount is preferably from 0 to 5% by mass, more preferably from 0 to 0.3% by mass.

After kept in contact with the cellulose acylate film, the contact vapor is fed to a condensation unit connected with a cooling unit, in which the contact vapor may be separated into a hot vapor and a condensate liquid.

Regarding the timing of the high temperature and high humidity treatment step in the production method of the invention, the high temperature and high humidity treatment step may be just after the stretching step or may be just after the drying step to be attained after the stretching step, or may also be after the step of once winding the film into a roll after the stretching step. In case where the film is processed for the high temperature and high humidity treatment after it has been once wound up into a roll, it may be processed directly as it is in the form of a roll, or after it is again unwound into a film.

(7) Drying Step after High Temperature and High Humidity Treatment:

The cellulose acylate film thus kept in contact with the contact vapor in the manner as above may be cooled to room temperature directly as it is, or for controlling the amount of the contact vapor molecules remaining in the film, the film may be subsequently conveyed into a drying zone. In case where the film is conveyed into a drying zone, there may be employed a method where hot air or warm air or air having a low vapor concentration is applied to the cellulose acylate film kept conveyed with rolls or the cellulose acylate film kept conveyed with both sides thereof clipped with a tenter, a method where the film is irradiated with heat rays, or a method where the film is kept in contact with heated rolls. Preferred is the method of applying hot air or warm air or air having a low vapor concentration to the film. In case where a water vapor contact step is taken before the heat treatment step, the heat treatment step may be the drying step.

(8) Heat Treatment Step after High Temperature and High Humidity Treatment:

Preferably in the production method of the invention, the high temperature and high humidity treatment step is followed by the above-mentioned heat treatment step. In the invention, the heat treatment step may be attained after the high temperature and high humidity treatment step and before the drying step; or after the high temperature and high humidity treatment step, the drying step may serve also as the heat treatment step; or after the high temperature and high humidity treatment step followed by the drying step, the film may be once wound up and may be thereafter processed for heat treatment in the separate step additionally provided in the method. Preferably in the invention, the heat treatment step is provided after the high temperature and high humidity treatment step and before the drying step. This is because the mode is advantageous in point of producing a film having more excellent thermal dimensional stability.

The reason why the shrinkage of the film could be reduced through the treatment is not clear, but it may be presumed that, in the film stretched in the stretching step, the residual stress in the stretching direction is large and the residual stress is solved by the heat treatment whereby the contraction force of the film in the region not higher than the heat treatment temperature could be thereby reduced.

The heat treatment may be attained according to a method of applying air at a predetermined temperature to the film being conveyed, or a method of using a heating means such as microwaves, etc.

During drying by heat treatment, the volumetric humidity is preferably 0 g/m$^3$. Preferably, the heat treatment temperature in the heat treatment step is the same as the temperature in the high temperature and high humidity treatment step from the viewpoint of preventing dew condensation and preventing the film from shrinking.

In the heat treatment step, the film tends to shrink in the machine direction or in the lateral direction. It is desirable that the shrinkage of the film is prevented as much as possible during the heat treatment for bettering the surface smoothness of the finished film. For this, preferably employed is a method of heat-treating the film with clipping or pinning both sides of the film in the lateral direction to thereby secure the width of the film (tenter mode). Also preferably, the film is elongated by from 0.9 times to 1.5 times in both the lateral direction and the machine direction of the film.

(9) Winding Step:

For winding up the produced film, an ordinary winder may be used, and the film may be wound up according to an ordinary winding method of a constant tension method, a constant torque method, a taper tension method or a programmed tension control method where the internal stress is kept constant. The film roll obtained in the manner as above is preferably such that the slow axis direction of the film is at ±2 degrees to the winding direction (machine direction of the film), more preferably at ±1 degree. Also preferably, the slow axis direction of the film is at ±2 degrees to the direction perpendicular to the winding direction (lateral direction of the film), more preferably at ±1 degree. Even more preferably, the slow axis direction of the film is at ±0.1 degrees to the winding direction (machine direction of the film), or it is at ±0.1 degrees to the lateral direction of the film.

Regarding the length thereof, the film thus produced in the manner as above is preferably wound up into a roll having a length of from 100 to 10000 m, more preferably from 500 to 7000 m, even more preferably from 1000 to 6000 m. The width of the film is preferably from 0.5 to 5.0 m, more preferably from 1.0 to 3.0 m, even more preferably from 1.0 to 2.5 m. In winding up the film, preferably, the film is knurled at least on one side thereof, and the knurling width is preferably from 3 mm to 50 mm, more preferably from 5 mm to 30 mm, and the knurling height is preferably from 0.5 to 500 µm, more preferably from 1 to 200 µm. The knurling may be in a mode of single pressing or double pressing.

The film of the invention is especially suitable for use in large-panel liquid crystal display devices. In case where the film is used as an optical compensatory film for large-panel liquid crystal display devices, preferably, the film is shaped to have a film width of, for example, at least 1470 mm. The optical compensatory film of the invention includes not only an embodiment of a film sheet cut in a size capable of being directly incorporated in a liquid crystal display device but also an embodiment of a film roll produced as a long film in continuous production and wound up into a roll. The optical compensatory film of the latter embodiment is stored and conveyed as it is, and when it is in fact incorporated into a liquid crystal display device or when it is stuck to a polarizing element or the like, it may be cut into a sheet having a desired size. The film of the invention formed as a long film may be stuck, directly as it is, with a polarizing element formed of a polyvinyl alcohol film or the like similarly as a long film, and thereafter when the thus-stuck films are in fact incorporated in a liquid crystal display device, they may be cut into a desired size. One embodiment of the optical compensatory film wound up in the form of a roll may have a roll length of at least 2500 mm.

Thus produced, the film is wound up to give a final product, cellulose acylate film.

In the production method for the cellulose acylate film of the invention, preferably, the thickness of the film is from 20 to 200 µm. When thinner than 20 µm, the mechanical strength of the film may be low and the film may be broken or troubled in its production, and the film surface condition may be poor. The high temperature and high humidity treatment effect is remarkable when the film thickness is within a range of from 20 to 200 µm. On the other hand, from the viewpoint of the production cost and the optical property appearance thereof, the cellulose acylate film is preferably so produced that its thickness could fall within the above-mentioned preferred range.

The film thickness may be controlled to be a desired one by controlling the solid concentration in the dope, the slit gap of the die nozzle, the extrusion pressure from the die, the metal support speed, etc.

[Polarizer]

The polarizer of the invention contains a polarizing element and the film of the invention on at least one side of the polarizing element. The polarizer of the invention is described below.

Like the film of the invention, the polarizer of the invention also includes not only an embodiment of a film sheet cut in a size capable of being directly incorporated in a liquid crystal display device but also an embodiment of a film roll produced as a long film in continuous production and wound up into a roll (for example, an embodiment having a roll length of at least 2500 mm or at least 3900 mm). For use in large-panel liquid crystal display devices, the width of the polarizer is preferably at least 1470 mm, as so mentioned in the above.

For the concrete constitution of the polarizer of the invention, any known constitution is employable with no limitation thereon. For example, the constitution described in FIG. 6 in JP-A 2008-262161 may be employed here.

[Liquid Crystal Display Device]

The liquid crystal display device of the invention contains at least one polarizer of the invention.

The liquid crystal display device of the invention comprises a liquid crystal cell and a pair of polarizers arranged on both sides of the liquid crystal cell, in which at least one polarizer is the polarizer of the invention. Preferably, the liquid crystal display device is an IPS, OCB or VA-mode liquid crystal display device.

The concrete constitution of the liquid crystal display device of the invention is not specifically defined, and any known constitution is employable therein. For example, one example of the constitution of the liquid crystal display device of the invention is shown in FIG. 1. In addition, the constitution described in FIG. 2 in JP-A 2008-262161 is also employable here.

EXAMPLES

The present invention will be further specifically explained with reference to the following examples of the present invention. The materials, amounts, ratios, types and procedures of treatments and so forth shown in the following examples can be suitably changed unless such changes depart from the gist of the present invention. Accordingly, the scope of the present invention should not be construed as limited to the following specific examples.

<<Measurement Methods>>

In the invention, the samples were analyzed to measure their properties according to the following measurement methods.

(Optical Appearance)

Using KOBRA 21ADH (by Oji Scientific Instruments), Re and Rth of the samples are measured at a wavelength of 450 nm, 550 nm and 630 nm, according to the method mentioned above. The measured Rth(550) is divided by the film thickness d to give Rth(550)/d. Further, Re(630)−Re(450) is computed to give ΔRe, and the resulting ΔRe is divided by Re(550) to give ΔRe/Re(550). The results are shown in Table 7 below.

(Internal Haze)

A few drops of glycerin are applied onto both surfaces of the cellulose acylate film sample (having a size of 40 mm×80 mm) to be analyzed, the film is sandwiched between two glass plates (MICRO SLIDE GLASS Lot No. S9213, by Matsunami) each having a thickness of 1.3 mm, and at 25° C. and at a relative humidity of 60%, the haze value of the sample is measured with a haze meter (HGM-2DP, by Suga Test Instruments) according to JIS K-6714. On the other hand, a few drops of glycerin are put between two glass plates, and the haze value thereof is measured. The latter value is subtracted from the former value to give the internal haze value (%) of the film sample. The results are shown in Table 7 below.

(Dimensional Change)

The dimensional change before and after 24 hours at 60° C. and at a relative humidity of 90%, or that is, {(L'−L0)/L0}× 100(%) is measured in the machine direction and in the direction perpendicular thereto. In this, L0 means the length (unit: mm) of the film before aged for 24 hours at 60° C. and at a relative humidity of 90%; and L' means the length (unit: mm) of the film after aged for 24 hours at 60° C. and at a relative humidity of 90% and further after conditioned for 2 hours. The sample film has a size of 30 mm×120 mm, and the other condition is as mentioned below.

The film is conditioned in an atmosphere at 25° C. and at a relative humidity of 60%, then using an automatic pin gauge (by Shinto Scientific), 6 mmφ holes are formed at intervals of 100 mm to be in parallel to the 120-mm side of the film, and the original dimension of the distance (L0) is measured to the minimum scale, 1/1000 mm. Then, after aged for 24 hours at 60° C. and at a relative humidity of 90%, the film is conditioned in an atmosphere at 25° C. and at a relative humidity of 60%, the dimension L' of the distance between the holes is measured.

The results are shown in Table 7 below.

Examples 1 to 22, and Comparative Examples 1 to 7

(1) Preparation of Synthetic Cellulose Acylate Resin:

Cellulose acylates each having the degree of acyl substitution shown in Table 7 were prepared. As a catalyst, sulfuric acid (7.8 parts by mass relative to 100 parts by mass of cellulose) was added, and each carboxylic acid was added for acylation at 40° C. Subsequently, the total degree of substitution and the degree of 6-substitution were controlled by controlling the amount of the sulfuric acid catalyst, the amount of water and the aging time. The aging time was 40° C. The cellulose acylate was washed with acetone to remove the low-molecular component thereof.

(2) Preparation of Dope:

<1-1> Cellulose Acylate Solution

The following ingredients were put into a mixing tank and dissolved by stirring. The mixture was heated at 90° C. for about 10 minutes, and filtered through paper filter having a mean pore size of 34 μm and through a sintered metal filter having a mean pore size of 10 μm.

a disperser to prepare a mat agent dispersion.

| Cellulose Acylate Solution of Example 1 | |
|---|---|
| Cellulose Acylate shown in Table 7 below | 100.0 parts by mass in total |
| Sugar Ester shown in Table 7 below | (amount shown in Table 7, unit: part by mass) |
| Other Additive shown in Table 7 below | (amount shown in Table 7, unit: part by mass) |
| Methylene Chloride | 403.0 parts by mass |
| Methanol | 60.2 parts by mass |

In Table 7 below, Ac means an acetyl group, Pr means a propionyl group, Pht means a phthalyl group. The structure of each additive is shown below. Comparative Example 5 is the cellulose ester film No. 101 in Example in JP-A 2009-1696; and the acryl A in Table 7 is the acrylic polymer A (main ingredient, polymethyl acrylate) described in the patent publication.

TABLE 5

| Sugar Ester | Skeleton | Acetyl Group | Benzoyl Group |
|---|---|---|---|
| 1 | A | 8 | 0 |
| 2 | A | 7 | 1 |
| 3 | A | 5 | 3 |
| 4 | B | 2 | 3 |
| 5 | A | 0 | 8 |
| 6 | B | 5 | 8 |

Skeleton A:

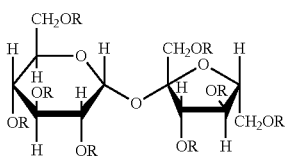

Skeleton B:

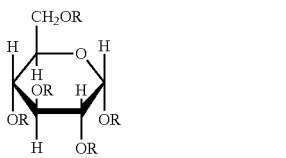

Compound (1): negative birefringent compound

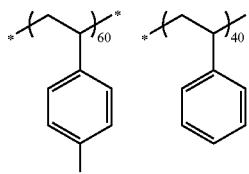

Compound (2): negative birefringent compound

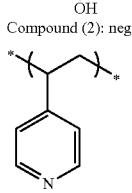

TABLE 6

| Compound (3): | | | | | |
|---|---|---|---|---|---|
| Dicarboxylic Acids | | | | | Number-Average Molecular Weight |
| Aromatic Dicarboxylic Acid | Aliphatic Dicarboxylic Acid | Ratio of Dicarboxylic Acids (by mol) | Diol Aliphatic Diol | Terminal | |
| PA/TPA | AA/SA | 10/50/30/10 | ethanediol | Ac residue | 800 |

Compound (4):

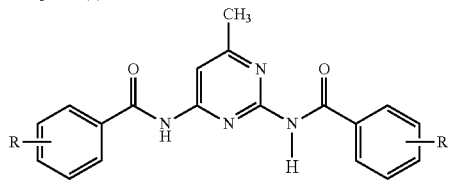

wherein one R is a methyl group and the other is a hydrogen atom.

Compound (5):

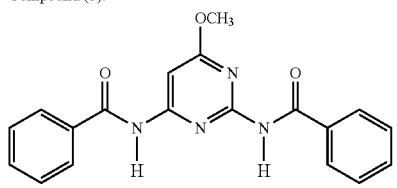

<1-2> Mat Agent Dispersion:

Next, the following composition containing the cellulose acylate solution prepared in the above was put into a disperser to prepare a mat agent dispersion.

| Mat Agent Dispersion | |
|---|---|
| Mat Agent (Aerosil R972) | 0.2 parts by mass |
| Methylene Chloride | 72.4 parts by mass |
| Methanol | 10.8 parts by mass |
| Cellulose Acylate Solution | 10.3 parts by mass |

100 parts by mass of the cellulose acylate solution in Example 1 was mixed with the mat agent dispersion in Example 1 in such a manner that the amount of the inorganic fine particles could be 0.02 parts by mass of the cellulose acylate resin, thereby preparing a dope for film formation.

(3) Casting:

The dope was cast, using a band caster. The band was made of SUS.

(4) Drying:

The web (film) obtained by casting was peeled from the band, and using a tenter for conveying the web by clipping it at both sides thereof, the web was dried in the tenter for 20 minutes. The drying temperature in the process is the film surface temperature.

Tg (glass transition temperature) of the thus-obtained, unstretched film was determined according to the following method. The film sample having a size of 5 mm×30 mm is conditioned at 25° C. and 60% RH for 2 hours or more, then using a dynamic viscoelastometer DVA-25 (by IT Keisoku Seigyo), this is analyzed at a frequency of 1 Hz. The chuck-to-chuck distance is 20 mm. The highest temperature at tan δ (=loss elastic modulus (E″)/storage elastic modulus (E′)) is determined, and this is Tg of the film. The results are shown in Table 7 below.

(5) Stretching:

The formed web (film) was peeled from the band, clipped, and stretched under the condition of side-fixed monoaxial stretching, in the direction perpendicular to the machine direction (lateral direction) at the stretching temperature and the draw ratio indicated in Table 7 below, while the residual solvent amount was from 30 to 5% relative to the total mass of the film, using a tenter.

Subsequently, the film was unclipped and dried at 110° C. for 30 minutes. In this, the casting thickness was so controlled that the thickness (unit, μm) of the stretched film could be as in Table 7.

(6) High Temperature and High Humidity Treatment:

The stretched film was processed for dew condensation prevention treatment, high temperature and high humidity treatment (water vapor contact treatment) and heat treatment in series.

In the dew condensation prevention treatment, dry air was applied to the film to control the film temperature (100° C.) Tf0.

In the high temperature and high humidity treatment (water vapor contact treatment), the absolute humidity of the wet vapor (volumetric humidity in high temperature and high humidity treatment) inside the wet vapor contact chamber was controlled to be the value as in Table 7, and the dew point of the wet vapor was so controlled as to be higher by at least 10° C. than the film temperature Tf0. While the film temperature (high temperature and high humidity treatment temperature) as shown in Table 7 was kept for the processing time (60 seconds), the film was conveyed through the chamber.

(7) Drying and (8) Heat Treatment after High Temperature and High Humidity Treatment:

In the heat treatment, the absolute humidity of the vapor in the heat treatment chamber (volumetric humidity in heat treatment) was 0 g/m³, and the temperature of the film (heat treatment temperature) was set to be the same temperature as the high temperature and high humidity treatment temperature, and the film was kept as such for the processing time (2 minutes). The film surface temperature was measured with tape-type thermocouple surface temperature sensors (Anritsu Meter's ST Series) stuck to three points of the film surface, and the data of the sensors were averaged.

(9) Winding:

Subsequently, the film was cooled to room temperature and wound up. For the purpose of determining the production aptitude of the film, at least 24 rolls of the film each having a roll width of 1280 mm and a roll length of 2600 mm were produced under the condition as above. Of those 24 rolls continuously produced, one roll was sampled at intervals of 100 m to give samples each having a length of 1 m (width of 1280 mm), and these were analyzed as films of Examples and Comparative Examples.

TABLE 7

| | Dope Composition | | | | | | | | Production Method | | | | | | Film Properties | | | | | | | |
|---|---|---|---|---|---|---|---|---|---|---|---|---|---|---|---|---|---|---|---|---|---|---|---|
| | Cellulose Acylate | | Cellulose Acylate | | Sugar Ester Compound | | Other Additive | | Stretching | | | High temperature and high humidity Treatment | | | Un-stretched | Film | Retardation | | | | | Internal Haze | Dimensional Change | |
| | type | mas. pts. [%] | type | mas. pts. [%] | type | mas. pts. [%] | type | mas. pts. [%] | tem-per-ature [°C] | draw ratio [%] | | tem-per-ature [°C] | volu-metric humidity [g/m³] | Tg [°C] | Thick-ness [μm] | Re (550) [nm] | Rth (550) [nm] | Rth(550)/ d × 10⁻³ | ΔRe [nm] | ΔRe/Re(550) | [%] | TD [%] | MD [%] |
| Example 1 | Ac 2.43 | 100 | — | — | 1 | 15 | — | — | 170 | 45 | | 100 | 300 | 190 | 65 | 50 | 115 | 1.8 | 8 | 0.17 | 0.05 | 0.1 | 0.3 |
| Example 2 | Ac 2.43 | 100 | — | — | 4 | 15 | — | — | 170 | 45 | | 100 | 300 | 190 | 65 | 55 | 127 | 1.9 | 7 | 0.12 | 0.06 | 0.1 | 0.4 |
| Example 3 | Ac 2.43 | 100 | — | — | 1 | 10 | compound (1) | 5 | 170 | 45 | | 100 | 300 | 190 | 65 | 48 | 109 | 1.7 | 11 | 0.23 | 0.07 | 0.1 | 0.2 |
| Example 4 | Ac 2.43 | 100 | — | — | 1 | 10 | compound (2) | 5 | 170 | 45 | | 100 | 300 | 190 | 65 | 45 | 104 | 1.6 | 13 | 0.28 | 0.07 | 0.1 | 0.3 |
| Example 5 | Ac 2.43 | 100 | — | — | 1 | 10 | acrylic A | 5 | 170 | 45 | | 100 | 300 | 190 | 65 | 49 | 113 | 1.7 | 9 | 0.19 | 0.07 | 0.1 | 0.3 |
| Example 6 | Ac 2.43 | 100 | — | — | 4 | 10 | compound (1) | 5 | 170 | 45 | | 100 | 300 | 190 | 65 | 52 | 120 | 1.8 | 9 | 0.17 | 0.06 | 0.1 | 0.2 |
| Example 7 | Ac 2.30 | 100 | — | — | 1 | 15 | — | — | 170 | 45 | | 100 | 300 | 190 | 46 | 53 | 121 | 2.7 | 6 | 0.11 | 0.05 | 0.1 | 0.3 |
| Example 8 | Ac 2.50 | 100 | — | — | 1 | 15 | — | — | 170 | 45 | | 100 | 300 | 189 | 46 | 48 | 109 | 2.4 | 11 | 0.23 | 0.05 | 0.1 | 0.4 |
| Example 9 | Ac 2.43 | 100 | — | — | 2 | 15 | — | — | 170 | 45 | | 100 | 300 | 190 | 65 | 53 | 121 | 1.9 | 8 | 0.15 | 0.05 | 0.1 | 0.3 |
| Example 10 | Ac 2.43 | 100 | — | — | 3 | 15 | — | — | 170 | 45 | | 100 | 300 | 190 | 65 | 55 | 127 | 1.9 | 8 | 0.14 | 0.06 | 0.1 | 0.3 |
| Example 11 | Ac 2.43 | 100 | — | — | 3 | 15 | — | — | 170 | 45 | | 100 | 300 | 180 | 65 | 48 | 109 | 1.7 | 8 | 0.17 | 0.05 | 0.1 | 0.2 |
| Example 12 | Ac 2.43 | 100 | — | — | 3 | 20 | — | — | 160 | 45 | | 100 | 300 | 180 | 65 | 52 | 118 | 1.8 | 8 | 0.16 | 0.05 | 0.1 | 0.3 |
| Example 13 | Ac 2.43 | 100 | — | — | 4 | 20 | — | — | 160 | 45 | | 100 | 300 | 180 | 65 | 58 | 132 | 2 | 7 | 0.13 | 0.05 | 0.1 | 0.3 |
| Example 14 | Ac 2.43 | 100 | — | — | 1 | 15 | — | — | 175 | 45 | | 80 | 300 | 180 | 78 | 51 | 117 | 1.5 | 8 | 0.16 | 0.04 | 0.1 | 0.3 |
| Example 15 | Ac 2.43 | 100 | — | — | 1 | 15 | — | — | 160 | 45 | | 120 | 300 | 180 | 52 | 49 | 113 | 2.2 | 9 | 0.18 | 0.06 | 0.1 | 0.3 |
| Example 16 | Ac 1.7 Pr 0.9 | 100 | — | — | 1 | 10 | — | — | 155 | 30 | | 100 | 300 | 175 | 55 | 50 | 138 | 2.5 | 6 | 0.11 | 0.05 | -0.1 | -0.15 |
| Example 17 | Ac 2.20 | 100 | — | — | 1 | 5 | — | — | 160 | 50 | | 100 | 300 | 190 | 25 | 45 | 115 | 4.6 | 5 | 0.11 | 0.04 | 0.1 | 0.3 |
| Example 18 | Ac 2.20 | 100 | — | — | 1 | 10 | — | — | 155 | 55 | | 100 | 300 | 190 | 22 | 47 | 113 | 5.1 | 5 | 0.11 | 0.05 | 0.1 | 0.2 |
| Example 19 | Ac 2.43 | 100 | — | — | 1 | 13 | — | 0 | 160 | 30 | | 100 | 300 | 190 | 49 | 50 | 120 | 2.4 | 8 | 0.16 | 0.03 | -0.3 | -0.1 |
| Example 20 | Ac 2.43 | 100 | — | — | 1 | 13 | compound (4) | 2 | 160 | 30 | | 100 | 300 | 186 | 50 | 51 | 119 | 2.4 | 6 | 0.12 | 0.02 | -0.2 | 0.0 |
| Example 21 | Ac 2.43 | 100 | — | — | 6 | 13 | compound (4) | 2 | 160 | 30 | | 100 | 300 | 172 | 52 | 50 | 115 | 2.2 | 6 | 0.12 | 0.01 | -0.1 | -0.1 |
| Example 22 | Ac 2.43 | 100 | — | — | 6 | 13 | compound (5) | 2 | 160 | 30 | | 100 | 300 | 172 | 52 | 50 | 115 | 2.2 | 6 | 0.12 | 0.01 | -0.1 | -0.1 |
| Comparative Example 1 | Ac 2.43 | 100 | — | — | 1 | 15 | — | — | 170 | 45 | | 100 | 300 | 190 | 65 | 51 | 117 | 1.8 | 8 | 0.17 | 0.05 | 0.3 | 0.9 |
| Comparative Example 2 | Ac 2.43 | 100 | — | — | 1 | 15 | — | — | 170 | 45 | | 150 | 500 | 190 | 65 | 35 | 81 | 1.2 | 6 | 0.17 | 0.10 | 0.1 | 0.3 |
| Comparative Example 3 | Ac 2.43 | 100 | — | — | 1 | 15 | — | — | 170 | 45 | | 70 | 140 | 190 | 65 | 43 | 98 | 1.5 | 7 | 0.17 | 0.08 | 0.2 | 0.6 |
| Comparative Example 4 | Ac 2.43 | 100 | — | — | 1 | 15 | — | — | 170 | 45 | | 40 | dipped in water | 190 | 65 | 51 | 116 | 1.8 | 8 | 0.17 | 0.05 | 0.3 | 0.8 |
| Comparative Example 5 | Ac 2.43 | 100 | — | — | 1 | 15 | — | — | 190 | 45 | | — | — | 190 | 65 | 40 | 91 | 1.4 | 7 | 0.17 | 0.04 | 0.1 | 0.4 |
| Comparative Example 6 | Ac 2.43 | 100 | — | — | — | — | compound (3) | 15 | 180 | 45 | | 100 | 300 | 190 | 65 | 55 | 115 | 1.8 | 8 | 0.15 | 0.20 | 0.1 | 0.4 |

TABLE 7-continued

| | Dope Composition | | | | | | | Production Method | | | | | | | Film Properties | | | | | | |
| | Cellulose Acylate | | Sugar Ester Compound | | | Other Additive | | Stretching | | | High temperature and high humidity Treatment | | | Un-stretched Tg [° C.] | Film Thickness [μm] | Retardation | | | | | In-ternal Haze [%] | Dimensional Change | |
| | type | mas. pts. [%] | type | mas. pts. [%] | type | mas. pts. [%] | tem-per-ature [° C.] | draw ratio [%] | tem-per-ature [° C.] | volu-metric humidity [g/m³] | | | Re (550) [nm] | Rth (550) [nm] | Rth(550)/ d × 10⁻³ | ΔRe [nm] | ΔRe/ Re(550) | | TD [%] | MD [%] |
| Comparative Example 7 | Ac 2.4 Pht 0.5 | 50 | Ac 1.6 Pr 0.9 | 50 | 5 | 10 | acrylic A | 3 | 170 | 45 | — | — | 180 | 65 | 78 | 169 | 2.6 | 5 | 0.07 | 0.04 | 0.1 | 0.1 |

From Table 7, it is known that the films of Examples all have high optical appearance and exhibit strong reversed wavelength dispersion characteristics, and their haze is small and their dimensional change in high temperature and high humidity environments is small.

On the other hand, it is known that the dimensional change in high temperature and high humidity environments of the film of Comparative Example 1 not processed for high temperature and high humidity treatment is great. It is also known that, for the film of Comparative Example 5 similarly not processed for high temperature and high humidity treatment, even when the stretching temperature is optimized in the direction of improving only the dimensional stability of the film, the optical appearance of the film is still insufficient. It is known that, for the film of Comparative Example 7 similarly not processed for high temperature and high humidity treatment, even when the type of the cellulose acylate is optimized in the direction of improving only the dimensional stability of the film, the optical appearance of the film is too great and therefore the film could not be controlled within the preferred range thereof for use for liquid crystal display devices. It is known that the film of Comparative Example 2, which was processed for high temperature and high humidity treatment under the high temperature and high humidity treatment condition overstepping the scope of the production method of the invention toward the side of high temperature and high volumetric humidity condition, is unsatisfactory in point of the optical appearance thereof. It is known that the film of Comparative Example 3, which was processed for high temperature and high humidity treatment under the high temperature and high humidity treatment condition overstepping the scope of the production method of the invention toward the side of low temperature and low volumetric humidity condition, is unsatisfactory in point of the optical appearance thereof, and in addition, the dimensional change of the film under high temperature and high humidity environments is great. It is known that the film of Comparative Example 6 not containing a sugar ester compound has a large internal haze.

(Production of Polarizer Sample)

The surface of the film produced in the above-mentioned Examples and Comparative Examples was alkali-saponified. Briefly, the film was dipped in an aqueous solution of sodium hydroxide 1.5 N at 55° C. for 2 minutes, then washed in a water-washing bath at room temperature, and neutralized with 0.1 sulfuric acid at 30° C. Again this was ashed in a water-washing bath at room temperature, and then dried with hot air at 100° C. Subsequently, a roll of polyvinyl alcohol film having a thickness of 80 µm was unrolled and continuously stretched by 5 times in an aqueous iodine solution and dried to give a polarizing element having a thickness of 20 µm. Using a 3% aqueous solution of polyvinyl alcohol (Kuraray's PVA-117H) as an adhesive, the alkali-saponified film of Examples and Comparative Examples was stuck to Fujitac TD80UL (by FUJIFILM) that had been alkali-saponified like in the above, with the polarizing element sandwiched therebetween in such as manner that the saponified surfaces of the two films could face the polarizing element side, thereby producing a polarizer in which the film of Examples and Comparative examples, the polarizing element, TD80UL were stuck together in that order. The polarizing element and the films were so arranged that the MD direction of the film of Examples and Comparative examples and the slow axis of TD80UL could be parallel to the absorption axis of the polarizing element.

(Production of Liquid Crystal Display Device)

The polarizers and the retardation films on the front side and the rear-side of a VA-mode liquid crystal TV (LC-46LX1, by Sharp) were peeled away from the device to prepare a liquid crystal cell for use herein. As in FIG. 1 (in this, the upper side is the front side), an outer protective film (not shown), a polarizing element 11, a film 14 of Examples and Comparative Examples shown in Table below (rear-side cellulose acylate film), a liquid crystal cell 13 (the above-mentioned VA liquid crystal cell), a film 15 of Examples and Comparative Examples shown in Table below (front-side cellulose acylate film), a polarizing element 12 and an outer protective film (not shown) were stuck together with an adhesive in that order, thereby producing a liquid crystal display device of Examples and Comparative Examples. In this, the polarizers were so arranged that the absorption axis of the upper and lower polarizers could be perpendicular to each other.

(Front Contrast)

Using a measuring instrument (BM5A, by TOPCON), the brightness of the display device was measured in a dark room at the time of black state and white state in the panel normal direction, and the front contrast (white-state brightness/black-state brightness) of the device was computed from the found data.

The results are shown in Table 8 below.

(Viewing Angle Contrast)

Using a measuring instrument (BM5A, by TOPCON), the brightness of the display device was measured in a dark room at the time of black state and white state in an oblique direction of 45° to the panel, and the front contrast (white-state brightness/black-state brightness) of the device was computed from the found data.

The results are shown in Table 8 below.

(Color Shift)

For display performance evaluation of the liquid crystal display device, the color shift (Δu'v') was determined under the condition mentioned below.

Using a measuring instrument (BM5A, by TOPCON), the brightness of the display device was measured in a dark room at the time of black state in the panel normal direction. The display device was fixed at a polar angle of 45°, and the visual field thereof was varied from 0 to 360° of the azimuth angle whereupon the color shift Δu'v' was determined as the index according to the following formula. The results are shown in Table 8 below.

$$\Delta u'v' = \{((u'(\text{maximum value}) - u'(\text{minimum value}))^2 + ((v'(\text{maximum value}) - v'(\text{minimum value}))^2\}^{0.5}$$

Preferably, the color shift Δu'v' is at most 0.06; and for practical use, the color shift is desired to be at most 0.05, more preferably at most 0.04.

(Corner Unevenness)

For display performance evaluation of the liquid crystal display device, the corner unevenness was determined under the condition mentioned below.

The produced liquid crystal display device was left at 60° C. and at a relative humidity of 90% for 240 hours, then conditioned at 25° C. and at a relative humidity of 60% for 24 hours, and the display device was visually checked for corner unevenness at the time of black state.

Thus observed, the corner unevenness level was evaluated according to the following criteria:

◯: Good.

Δ: Some corner unevenness found.

x: Extreme corner unevenness found.

The results are shown in Table 8 below.

TABLE 8

| | Front CR | Viewing Angle CR (obliquely at 45°) | Color Shift (Δu'v') | Corner Unevenness Level |
|---|---|---|---|---|
| Example 1 | 3980 | 113 | 0.04 | ○ |
| Example 2 | 3960 | 49 | 0.05 | ○ |
| Example 3 | 3940 | 113 | 0.03 | ○ |
| Example 4 | 3940 | 68 | 0.02 | ○ |
| Example 5 | 3940 | 113 | 0.04 | ○ |
| Example 6 | 3960 | 85 | 0.04 | ○ |
| Example 7 | 3989 | 86 | 0.05 | ○ |
| Example 8 | 3989 | 95 | 0.03 | ○ |
| Example 9 | 3982 | 86 | 0.05 | ○ |
| Example 10 | 3975 | 63 | 0.05 | ○ |
| Example 11 | 3989 | 95 | 0.04 | ○ |
| Example 12 | 3989 | 94 | 0.05 | ○ |
| Example 13 | 3989 | 45 | 0.05 | ○ |
| Example 14 | 4017 | 97 | 0.04 | ○ |
| Example 15 | 3975 | 101 | 0.04 | ○ |
| Example 17 | 4017 | 113 | 0.06 | ○ |
| Example 18 | 3989 | 101 | 0.06 | ○ |
| Example 19 | 4017 | 85 | 0.04 | ○ |
| Example 20 | 4074 | 92 | 0.05 | ○ |
| Example 21 | 4103 | 113 | 0.05 | ○ |
| Example 22 | 4103 | 113 | 0.05 | ○ |
| Comparative Example 1 | 3980 | 97 | 0.04 | x |
| Comparative Example 2 | 3800 | 23 | 0.04 | ○ |
| Comparative Example 3 | 3648 | 52 | 0.06 | Δ |
| Comparative Example 4 | 3648 | 99 | 0.06 | x |
| Comparative Example 5 | 4200 | 34 | 0.04 | ○ |
| Comparative Example 6 | 3600 | 113 | 0.05 | ○ |
| Comparative Example 7 | 4000 | 8 | 0.06 | ○ |

The liquid crystal display device of Example 16 was evaluated in the same manner as above, and gained the same results as those of the other Examples in the above Table 8.

From the above, it is known that the liquid crystal display devices of Examples are all good in point of the front contrast, the viewing angle contrast, the color shift and the corner unevenness level.

On the other hand, it is known that, when the film of Comparative Example 1 having a large dimensional change in wet environments is used, then the corner unevenness level of the liquid crystal display device is high. It is known that, when the films of Comparative Examples 2 and 5 having poor optical appearance are used, then the liquid crystal display devices are not good in point of the viewing angle contrast. It is known that, when the films of Comparative Examples 3 and 4 having a large dimensional change in the MD direction in wet environments are used, then the front contrast is small, the color shift is large and the corner unevenness level is high. It is known that when the film of Comparative Example 6 having a large internal haze is used, then the front contrast is small. It is known that, when the film of Comparative Example 7 of which the retardation is too large is used, then the viewing angle contrast is small and the color shift is large.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2010-96470, filed on Apr. 19, 2010; Japanese Patent Application No. 2010-188438, filed on Aug. 25, 2010; and Japanese Patent Application No. 2011-51796, filed on Mar. 9, 2011, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A cellulose acylate film comprising:
   a cellulose acylate and a sugar ester compound,
   wherein the sugar ester comprises from 1 to 12 pyranose structures or furanose structures in which at least one hydroxyl group is esterified,
   wherein the film has an in-plane retardation at a wavelength of 550 nm satisfying the following formula (1):

$$40 \text{ nm} \leq Re(550) \leq 60 \text{ nm} \tag{1}$$

wherein RE (550) means the in-plane retardation of the film at a wavelength of 550 nm,
   wherein the film has a thickness-direction retardation at a wavelength of 550 nm satisfying the following formula (2):

$$100 \text{ nm} \leq Rth(550) \leq 140 \text{ nm} \tag{2}$$

wherein Rth (550) means the thickness-direction retardation of the film at a wavelength of 550 nm,
   the film has a dimensional change before and after 24 hours at 60° C. and at a relative humidity of 90% satisfying the following formula (3) in the film conveying direction and in the direction perpendicular thereto, $$-0.5\% \leq \{(L'-L0)/L0\} \times 100 \leq 0.5\% \tag{3}$$

wherein L0 means the length (unit: mm) of the film before aged for 24 hours at 60° C. and at a relative humidity of 90%; and L' means the length (unit: mm) of the film after aged for 24 hours at 60° C. and at a relative humidity of 90% and further after conditioned for 2 hours,
   wherein the film has an internal haze of at most 0.1%,
   wherein the cellulose acylate film is free from a compound having a negative birefringence,
   wherein the degree of acyl substitution of the cellulose acylate is from 2.0 to 2.6, and
   wherein all the acyl groups in the cellulose acylate are acetyl groups.

2. The cellulose acylate film according to claim 1, satisfying the following formula (4):

$$0.02 \leq \Delta Re/Re(550) \leq 0.28 \tag{4}$$

$$\Delta Re = Re(630) - Re(450) \tag{4'}$$

wherein Re (630) means the in-plane retardation of the film at a wavelength of 630 nm; Re (450) means the in-plane retardation of the film at a wavelength of 450 nm; Re (550) means the in-plane retardation of the film at a wavelength of 550 nm.

3. The cellulose acylate film according to claim 1, satisfying the following formula (5):

$$0.11 \leq \Delta Re/Re(550) \leq 0.23 \quad (5)$$

$$\Delta Re = Re(630) - Re(450) \quad (5')$$

wherein Re (630) means the in-plane retardation of the film at a wavelength of 630 nm; Re (450) means the in-plane retardation of the film at a wavelength of 450 nm; Re (550) means the in-plane retardation of the film at a wavelength of 550 nm.

4. The cellulose acylate film according to claim 1, satisfying the following formula (6):

$$1.5 \times 10^{-3} < Rth(550)/d \quad (6)$$

wherein Rth (550) means the thickness-direction retardation (unit: nm) of the film at a wavelength of 550 nm, and d means the thickness (unit: mm) of the film.

5. The cellulose acylate film according to claim 1, having a thickness of from 40 to 80 μm.

6. The cellulose acylate film according to claim 1, comprising a nitrogen-containing aromatic compound-type plasticizer.

7. A polarizer comprising a polarizing element and the cellulose acylate film comprising:

a cellulose acylate and a sugar ester compound, wherein the sugar ester comprises from 1 to 12 pyranose structures or furanose structures in which at least one hydroxyl group is esterified, wherein the film has an in-plane retardation at a wavelength of 550 nm satisfying the following formula (1):

$$40 \text{ nm} \leq Re(550) \leq 60 \text{ nm} \quad (1)$$

wherein RE (550) means the in-plane retardation of the film at a wavelength of 550 nm, wherein the film has a thickness-direction retardation at a wavelength of 550 nm satisfying the following formula (2):

$$100 \text{ nm} \leq Rth(550) \leq 140 \text{ nm} \quad (2)$$

wherein Rth (550) means the thickness-direction retardation of the film at a wavelength of 550 nm, the film has a dimensional change before and after 24 hours at 60° C. and at a relative humidity of 90% satisfying the following formula (3) in the film conveying direction and in the direction perpendicular thereto, $$-0.5\% \leq \{(L'-L0)/L0\} \times 100 \leq 0.5\% \quad (3)$$

wherein L0 means the length (unit: mm) of the film before aged for 24 hours at 60° C. and at a relative humidity of 90%; and U means the length (unit: mm) of the film after aged for 24 hours at 60° C. and at a relative humidity of 90% and further after conditioned for 2 hours, wherein the film has an internal haze of at most 0.1% on at least one side of the polarizing element, wherein the cellulose acylate film is free from a compound having a negative birefringence, wherein the degree of acyl substitution of the cellulose acylate is from 2.0 to 2.6, and wherein all the acyl groups in the cellulose acylate are acetyl groups.

8. A liquid crystal display device comprising a polarizing element and the cellulose acylate film comprising a cellulose acylate and a sugar ester compound wherein the sugar ester comprises from 1 to 12 pyranose structures or furanose structures in which at least one hydroxyl group is esterified, wherein the film has an in-plane retardation at a wavelength of 550 nm satisfying the following formula (1):

$$40 \text{ nm} \leq Re(550) \leq 60 \text{ nm} \quad (1)$$

wherein RE (550) means the in-plane retardation of the film at a wavelength of 550 nm, wherein the film has a thickness-direction retardation at a wavelength of 550 nm satisfying the following formula (2):

$$100 \text{ nm} \leq Rth(550) \leq 140 \text{ nm} \quad (2)$$

wherein Rth (550) means the thickness-direction retardation of the film at a wavelength of 550 nm, the film has a dimensional change before and after 24 hours at 60° C. and at a relative humidity of 90% satisfying the following formula (3) in the film conveying direction and in the direction perpendicular thereto, $$-0.5\% \leq \{(L'-L0)/L0\} \times 100 \leq 0.5\% \quad (3)$$

wherein L0 means the length (unit: mm) of the film before aged for 24 hours at 60° C. and at a relative humidity of 90%; and L' means the length (unit: mm) of the film after aged for 24 hours at 60° C. and at a relative humidity of 90% and further after conditioned for 24 hours, wherein the film has an internal haze of at most 0.1% on at least one side of the polarizing element, wherein the cellulose acylate film is free from a compound having a negative birefringence, wherein the degree of acyl substitution of the cellulose acylate is from 2.0 to 2.6, and wherein all the acyl groups in the cellulose acylate are acetyl groups.

* * * * *